US010974530B2

(12) United States Patent
Bollström et al.

(10) Patent No.: US 10,974,530 B2
(45) Date of Patent: Apr. 13, 2021

(54) METHOD FOR MANUFACTURING A WATER-INSOLUBLE PATTERN

(71) Applicant: OMYA INTERNATIONAL AG, Oftringen (CH)

(72) Inventors: Roger Bollström, Zofingen (CH); Patrick A. C. Gane, Rothrist (CH)

(73) Assignee: OMYA INTERNATIONAL AG, Oftringen (CH)

( * ) Notice: Subject to any disclaimer, the term of this patent is extended or adjusted under 35 U.S.C. 154(b) by 44 days.

(21) Appl. No.: 16/332,353

(22) PCT Filed: Sep. 12, 2017

(86) PCT No.: PCT/EP2017/072877
§ 371 (c)(1),
(2) Date: Mar. 11, 2019

(87) PCT Pub. No.: WO2018/050630
PCT Pub. Date: Mar. 22, 2018

(65) Prior Publication Data

US 2019/0202223 A1 Jul. 4, 2019

(30) Foreign Application Priority Data

Sep. 13, 2016 (EP) .................................... 16188664

(51) Int. Cl.

| | |
|---|---|
| ***B32B 3/00*** | (2006.01) |
| ***B41M 3/00*** | (2006.01) |
| ***B41M 3/14*** | (2006.01) |
| ***B41M 3/16*** | (2006.01) |

(Continued)

(52) U.S. Cl.
CPC .............. *B41M 3/006* (2013.01); *B41M 3/14* (2013.01); *B41M 3/148* (2013.01); *B41M 3/16* (2013.01); *B41M 3/142* (2013.01); *B41M 3/18* (2013.01); *B41M 5/0047* (2013.01)

(58) Field of Classification Search
CPC .......... B41M 3/006; B41M 3/14; B41M 3/16; B41M 3/142; B41M 3/148; B41M 5/0047
See application file for complete search history.

(56) References Cited

U.S. PATENT DOCUMENTS

| | | | |
|---|---|---|---|
| 8,460,510 | B2 | 6/2013 | Gane et al. |
| 2005/0031838 | A1 | 2/2005 | Lagunowich et al. |
| 2006/0202469 | A1 | 9/2006 | Teitelbaum et al. |

(Continued)

FOREIGN PATENT DOCUMENTS

| | | |
|---|---|---|
| CN | 1830691 A | 9/2006 |
| EP | 0534634 | 3/1993 |

(Continued)

OTHER PUBLICATIONS

International Search Report and Written Opinion dated Dec. 6, 2017 in corresponding International Patent Application No. PCT/EP2017/072877, filed Sep. 12, 2017, 12 pages.

(Continued)

*Primary Examiner* — Elizabeth E Mulvaney
(74) *Attorney, Agent, or Firm* — Dentons US LLP

(57) ABSTRACT

A method of manufacturing a water-insoluble pattern on and/or within a substrate is described. Also described, is a substrate obtained by such a method, a product including such a substrate and the use of the substrate in different applications.

27 Claims, 14 Drawing Sheets

(51) Int. Cl.
*B41M 3/18* (2006.01)
*B41M 5/00* (2006.01)

(56) References Cited

U.S. PATENT DOCUMENTS

| | | | | |
|---|---|---|---|---|
| 2012/0031576 | A1 | 2/2012 | Gane et al. | |
| 2014/0151996 | A1 | 6/2014 | Camus | |
| 2017/0065974 | A1* | 3/2017 | Bollstrom | C09D 5/1681 |
| 2018/0022135 | A1* | 1/2018 | Bollstrom | B41M 5/52 347/101 |
| 2018/0056690 | A1* | 3/2018 | Bollstrom | C09D 11/328 |
| 2018/0333975 | A1* | 11/2018 | Bollstrom | D21H 27/10 |
| 2018/0340298 | A1* | 11/2018 | Bollstrom | B42D 25/29 |
| 2019/0225849 | A1* | 7/2019 | Bollstrom | C04B 41/009 |

FOREIGN PATENT DOCUMENTS

| | | |
|---|---|---|
| EP | 1712523 | 10/2006 |
| EP | 1712597 | 10/2006 |
| EP | 2264108 | 12/2010 |
| EP | 2264109 | 12/2010 |
| EP | 2371766 | 10/2011 |
| EP | 2447213 | 5/2012 |
| EP | 2524898 | 11/2012 |
| EP | 2626388 | 8/2013 |
| EP | 2949813 | 12/2015 |
| WO | 00/39222 | 7/2000 |
| WO | 03/049515 | 6/2003 |
| WO | 2008/024542 | 2/2008 |
| WO | 2009/074492 | 6/2009 |
| WO | 2013/142473 | 9/2013 |

OTHER PUBLICATIONS

European Search Report dated Mar. 24, 2017 in corresponding European Patent Application No. 16188664.3, filed Sep. 13, 2016, 8 pages.

Chinese Office Action dated Jun. 1, 2020 in corresponding Chinese Patent Application No. 201780056180.7, filed Sep. 12, 2017, 21 pages.

* cited by examiner

METHOD FOR MANUFACTURING A WATER-INSOLUBLE PATTERN

CROSS-REFERENCE TO PRIOR APPLICATIONS

This application is a National Stage of PCT/EP2017/072877, filed Sep. 12, 2017, and designating the United States (published on Mar. 22, 2018, as WO 2018/050630 A1), which claims priority under 35 U.S.C. § 119 to European Patent Application No. 16188664.3, filed Sep. 13, 2016, each hereby expressly incorporated by reference in its entirety and each assigned to the assignee hereof.

The present invention relates to a method of manufacturing a water-insoluble pattern on and/or within a substrate, a substrate obtainable by said method, a product comprising said substrate and the use of the substrate in different applications.

Marking, stamps or identifying images are applied in visible or hidden form to a great variety of products for labeling, identification or anti-counterfeiting purposes.

The possibility to produce more sophisticated patterns or images with modern printing and coating technology, which has become more available and affordable in recent years, has led to an increasing demand for unusual and unique patterns for commercial applications, advertisement and branding. The rapid development of printing and coating technology, however, has also paved the way for potentially easier counterfeiting or copying of brands, products, bank notes and the like.

Moreover, in recent years, progress in micro and nanotechnology created new fields of application for chemically defined and tailor-made patterned substrates such as microfluidic or lab-on-a-chip devices. A variety of technical methods is used for this purpose involving printing technologies such as inkjet printing, screen printing, or flexography, as well as microfabrication technology such as photolithography, plasma or laser treatment. However, these methods are often limited with respect to the substrates that can be used or require extensive technical equipment.

EP 2 949 813 A1 relates to a method of manufacturing a surface-modified material, wherein a substrate, which comprises on at least one side a coating layer comprising a salifiable alkaline or alkaline earth compound, is treated with a liquid composition comprising an acid to form at least one surface-modified region on the coating layer.

EP 2 626 388 A1 relates to a composition comprising hedgehog shaped particles, at least one binder, and at least one hydrophobising agent and/or at least one hydrophilising agent, which can be used for controlling the wettability of substrate compositions.

US 2005/0031838 A1 describes a taggant security system for paper products comprising the incorporation of taggants such as fluorescent dyers or phosphors. However, the inclusion of such taggants can lead to problems during paper production such as repulping.

WO 2008/024542 A1 describes a method, wherein a reflective feature is formed by a direct-write printing process using an ink comprising metallic particles.

US 2014/0151996 A1 relates to security elements with an optical structure making it possible to vary the appearance of the security element when the viewing angle is modified. However, these security elements are visible to the naked eye under specific conditions, and thus, can be easily recognised by a potential counterfeiter.

In this context, the applicant also would like to mention the unpublished European patent application with filing number 15 159 107.0 in its name, which relates to a method of creating a hidden pattern, the unpublished European patent application with filing number 15 159 109.6 in its name, which refers to an inkjet printing method, the unpublished European patent application with filing number 15 196 085.3 in its name, which relates to a method of tagging a substrate, and the unpublished European patent application with filing number 15 196 143.0 in its name, which relates to a printed watermark.

In view of the foregoing, there still remains a need for methods of creating patterns on a substrate.

Accordingly, it is an object of the present invention to provide a method for manufacturing patterns on a substrate. It is also an object of the present invention to provide a method of manufacturing a pattern featuring defined optical, structural or chemical properties. It is also an object to provide a method for modifying the surface properties of a substrate in a controlled and easy manner with high accuracy. It is also desirable that the method is easy to implement in existing print facilities. It is also desirable that the method is suitable for both small and large production volume. Furthermore, it is desirable that the method can be used for a great variety of materials, and does not affect the properties of the materials in a negative way.

It is also an object of the present invention to provide a pattern, which allows a simple and immediate authentication. It is also desirable that the pattern is not easily detectable by a potential counterfeiter and/or difficult to manipulate and/or difficult to reproduce. It is also desirable that the pattern is observable for the human eye and/or can be reliably detected with standard measurement instruments. Moreover, it is also desirable that the pattern can be equipped with further functionalities making it machine readable and is combinable with prior art security elements.

The foregoing and other objects are solved by the subject-matter as defined herein in the independent claims.

According to one aspect of the present invention, a method of manufacturing a water-insoluble pattern on and/or within a substrate, is provided, comprising the following steps:

a) providing a substrate,
b) providing a treatment composition A comprising a deliquescent salt,
c) providing a treatment composition B comprising an acid or a salt thereof, wherein the deliquescent salt of the treatment composition A and the acid or the salt thereof of the treatment composition B are selected such that the cation of the deliquescent salt and the anion of the acid or the salt thereof are capable of forming a water-insoluble salt in aqueous medium, and d) depositing the treatment composition A and the treatment composition B onto at least one surface region of the substrate to form at least one water-insoluble pattern on and/or within a substrate, wherein the treatment composition A and the treatment composition B are at least partially contacted and are deposited simultaneously or consecutively in any order.

According to another aspect of the present invention, a substrate comprising a water-insoluble pattern obtainable by a method according to the present invention, is provided.

According to a further aspect of the present invention, a product, comprising a substrate according to the present invention, is provided, wherein the product is a tool for bioassays, a microfluidic device, a lab-on-a-chip device, a paper-based analytical and/or diagnostic tool, a separation platform, a print medium, a packaging material, a data storage, a security document, a non-secure document, a decorative substrate, a drug, a tobacco product, a bottle, a garment, a container, a sporting good, a toy, a game, a mobile phone, a CD, a DVD, a blue ray disk, a machine, a tool, a car part, a sticker, a label, a tag, a poster, a passport, a driving licence, a bank card, a credit card, a bond, a ticket, a postage stamp, a tax stamp, a banknote, a certificate, a brand authentication tag, a business card, a greeting card, a braille document, a tactile document, or a wall paper.

According to still a further aspect of the present invention, use of a substrate, comprising a water-insoluble pattern according to the present invention, is provided, in tactile application, in braille applications, in printing applications, in analytical applications, in diagnostic applications, in bioassays, in chemical applications, in electrical applications, in security devices, in overt or covert security elements, in brand protection, in micro lettering, in micro imaging, in decorative, artistic, or visual applications, or in packaging applications.

Advantageous embodiments of the present invention are defined in the corresponding sub-claims.

According to one embodiment, the treatment composition A or treatment composition B is provided in liquid form, preferably treatment composition A and treatment composition B are provided in liquid form.

According to one embodiment the substrate is a planar substrate having a first side and a reverse side, and the treatment composition A and the treatment composition B are deposited onto the first side of the substrate, or the treatment composition A and the treatment composition B are deposited onto the reverse side of the substrate. According to another embodiment the substrate is a planar substrate having a first side and a reverse side, and the treatment composition A is deposited onto the first side of the substrate and treatment composition B is deposited onto the reverse side of the substrate, or the treatment composition B is deposited onto the first side of the substrate and treatment composition A is deposited onto the reverse side of the substrate.

According to one embodiment, step d) of the inventive method comprises the steps of:

i) depositing the treatment composition A, and
ii) subsequently depositing the treatment composition B, wherein the treatment composition A is contacted at least partially with the treatment composition B.

According to one embodiment, step d) of the inventive method comprises the steps of i) depositing the treatment composition B, and
ii) subsequently depositing the treatment composition A, wherein the treatment composition B is contacted at least partially with the liquid treatment composition A.

According to one embodiment, the substrate is dried after step i) and/or step ii).

According to one embodiment, the deliquescent salt of composition A is selected from the group consisting of chlorates, sulphates, halides, nitrates, carboxylates, and mixtures and hydrates thereof, preferably selected from the group consisting of chlorates, sulphates, chlorides, bromides, iodides, nitrates, citrates, acetates, and mixtures and hydrates thereof, and most preferably selected from the group consisting of zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate, and mixtures and hydrates thereof.

According to one embodiment, the treatment composition A comprises the deliquescent salt in an amount from 0.1 to 100 wt.-%, based on the total weight of the treatment composition, preferably in an amount from 1 to 80 wt.-%, more preferably in an amount from 3 to 60 wt.-%, and most preferably in an amount from 10 to 50 wt.-%.

According to one embodiment, the acid or the salt thereof is selected from the group consisting of hydrochloric acid, sulphuric acid, sulphurous acid, phosphoric acid, oxalic acid, tartaric acid, salts thereof, carbonates, and mixtures thereof, and preferably the acid or the salt thereof is selected from the group consisting of phosphoric acid, oxalic acid, tartaric acid, and mixtures thereof.

According to one embodiment, the treatment composition B comprises the acid or the salt thereof in an amount from 0.1 to 100 wt.-%, based on the total weight of the treatment composition, preferably in an amount from 1 to 80 wt.-%, more preferably in an amount from 3 to 60 wt.-%, and most preferably in an amount from 10 to 50 wt.-%.

According to one embodiment, the substrate is selected from the group comprising paper, cardboard, containerboard, plastic, cellophane, textile, wood, metal, glass, mica plate, cellulose, nitrocellulose, cotton, marble, calcite, natural stone, composite stone, brick, concrete, tablet, canvas, natural materials of human or animal origin, and laminates or composites thereof, preferably paper, cardboard, containerboard, or plastic.

According to one embodiment, the treatment composition A and/or the treatment composition B is/are deposited by electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating and/or a pencil, preferably by inkjet printing or spray coating.

According to one embodiment, the water-insoluble pattern is a channel, a barrier, an array, a one-dimensional bar code, a two-dimensional bar code, a three-dimensional bar code, a security mark, a number, a letter, an alphanumerical symbol, a text, a logo, an image, a shape, a braille marking, or a design.

According to one embodiment, the water-insoluble pattern is a hidden pattern, which is invisible when viewed at a first angle relative to the surface of the substrate, and visible when viewed from a second angle relative to the surface of the substrate.

It should be understood that for the purpose of the present invention, the following terms have the following meaning.

In the meaning of the present invention "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate.

In the meaning of the present invention a "pattern" is defined as a material comprising a water-insoluble salt which is formed in a specific design such as a channel, a barrier, a one-dimensional bar code, a two-dimensional bar code, a three-dimensional bar code, a security mark, a number, a letter, an alphanumerical symbol, a text, a logo, an image, a braille marking, or a shape. The mentioned examples are, however, not limiting.

In the present context, the term "substrate" is to be understood as any material having a surface suitable for printing, coating or painting on, such as paper, cardboard, containerboard, plastic, cellophane, textile, wood, metal, glass, mica plate, cellulose, nitrocellulose, marble, calcite, natural stone, composite stone, brick, concrete, or natural materials of human or animal origin, preferably paper, cardboard, containerboard, or plastic. The mentioned examples are, however, not of limitative character.

In the meaning of the present invention, the expression "pattern on a substrate" refers to a pattern which is disposed on the surface of the substrate and the expression "within a substrate" refers to a pattern which is absorbed by or permeated into the bulk of the substrate.

The term "treatment composition" as used herein, refers to a composition in liquid or dry form, which can be deposited onto a surface region of the substrate of the present invention.

The term "deliquescent salt" as used herein refers to a salt that has a high affinity for moisture and can collect gaseous water molecules from the atmosphere to form a mixture of the solid salt and liquid water, or an aqueous solution of the salt, until the substance is dissolved (cf. definition of "deliquescence", IUPAC, Compendium of Chemical Terminology Goldbook, version 2.3.3, 2014). Non-limiting examples of a "deliquescent salt" are magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, silver nitrate, zinc nitrate, aluminium nitrate, magnesium acetate, calcium acetate, iron acetate, copper acetate, zinc acetate or aluminium acetate.

According to one embodiment, the term "deliquescent salt" as used herein refers to a salt that absorbs at least 16 g of $H_2O$/mol of salt, i.e. 1 mol of $H_2O$/mol of salt of water from the atmosphere, when stored for 24 h at 20° C. in an atmosphere with a water content of 14 g/m$^3$, to form a mixture of solid salt and liquid water or an aqueous solution of the salt.

For the purpose of the present invention, an "acid" is defined as Brønsted-Lowry acid, that is to say, it is an $H_3O^+$ ion provider. In accordance with the present invention, $pK_a$, is the symbol representing the acid dissociation constant associated with a given ionisable hydrogen in a given acid, and is indicative of the natural degree of dissociation of this hydrogen from this acid at equilibrium in water at a given temperature. Such $pK_a$ values may be found in reference textbooks such as Harris, D. C. "Quantitative Chemical Analysis: 3$^{rd}$ Edition", 1991, W.H. Freeman & Co. (USA), ISBN 0-7167-2170-8.

A "suspension" or "slurry" in the meaning of the present invention comprises insoluble solids and water, and optionally further additives, and usually contains large amounts of solids and, thus, is more viscous and can be of higher density than the liquid from which it is formed.

As used herein, the abbreviation "μl" refers to the unit "micro litre", the abbreviation "nl" refers to the unit "nano litre", the abbreviation "pl" refers to the unit "pico litre" and the abbreviation "fl" refers to the unit "femto litre". As known to the skilled person, 1 micro litre equals $10^{-6}$ litre, 1 nano litre equals $10^{-9}$ litre, 1 pico litre equals $10^{-12}$ litre and 1 femto litre equals $10^{-15}$ litre.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to one aspect of the present invention, a method of manufacturing a water-insoluble pattern on and/or within a substrate, is provided, comprising the following steps: a) providing a substrate, b) providing a treatment composition A comprising a deliquescent salt, c) providing a treatment composition B comprising an acid or a salt thereof, wherein the deliquescent salt of the treatment composition A and the acid or the salt thereof of the treatment composition B are selected such that the cation of the deliquescent salt and the anion of the acid or the salt thereof are capable of forming a water-insoluble salt in aqueous medium, and d) depositing the treatment composition A and the treatment composition B onto at least one surface region of the substrate to form at least one water-insoluble pattern on and/or within a substrate, wherein the treatment composition A and the treatment composition B are at least partially contacted and are deposited simultaneously or consecutively in any order.

In the following the details and preferred embodiments of the inventive method will be set out in more detail. It is to be understood that these technical details and embodiments also apply to the inventive patterned substrate and the use thereof as well as to the product comprising such a substrate.

Method Step a)

According to step a) of the method of the present invention, a substrate is provided.

The substrate serves as a basis for the water-insoluble pattern and may be porous or non-porous. According to a preferred embodiment, the substrate is porous. In that case the treatment composition A and/or treatment composition B may be at least partially absorbed by the substrate, which may increase the adhesion of the formed water-insoluble pattern on and/or within the substrate.

According to one embodiment, the substrate is selected from the group consisting of paper, cardboard, containerboard, plastic, cellophane, textile, wood, metal, glass, mica plate, cellulose, nitrocellulose, cotton, marble, calcite, natural stone, composite stone, brick, concrete, tablet, canvas, natural materials of human or animal origin, and laminates or composites thereof. According to a preferred embodiment, the substrate is selected from the group consisting paper, cardboard, containerboard, or plastic, and more preferably the substrate is paper. Non-limiting examples for paper are eucalyptus fibre paper or cotton fibre paper.

According to another embodiment, the substrate is a laminate of paper, plastic and/or metal, wherein preferably the plastic and/or metal are in form of thin foils such as for example used in Tetra Pak®. However, any other material having a surface suitable for printing, coating or painting on may also be used as substrate.

According to one embodiment of the present invention, the substrate is paper, cardboard, or containerboard. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board. The paper, cardboard, or containerboard substrate can have a basis weight from 10 to 1 000 $g/m^2$, from 20 to 800 $g/m^2$, from 30 to 700 $g/m^2$, or from 50 to 600 $g/m^2$. According to one embodiment, the substrate is paper, preferably having a basis weight from 10 to 400 $g/m^2$, 20 to 300 $g/m^2$, 30 to 200 $g/m^2$, 40 to 100 $g/m^2$, 50 to 90 $g/m^2$, 60 to 80 $g/m^2$, or about 70 $g/m^2$.

According to another embodiment, the substrate is a plastic substrate. Suitable plastic materials are, for example, polyethylene, polypropylene, polyvinylchloride, polyesters, polycarbonate resins, or fluorine-containing resins, preferably polypropylene. Examples for suitable polyesters are poly(ethylene terephthalate), poly(ethylene naphthalate) or poly(ester diacetate). An example for a fluorine-containing resin is poly(tetrafluoro ethylene).

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers, wherein the sublayers can have a flat or non-flat structure, e.g. a corrugated structure. Preferably the sublayers of the substrate are made from paper, cardboard, containerboard and/or plastic.

A "natural material of human or animal origin" in the meaning of the present invention is as any material, which is derived from the body of a living or dead human or the body of a living or dead animal. Said term also includes products produced by animals such as eggshells or pearls. The term "animal" as used herein refers to eukaryotic organisms such as mammals, fish, birds, reptiles, amphibians, insects, or molluscs. The natural material may be selected from the group consisting of a reptile eggshell, a bird eggshell, a monotreme eggshell, a tooth, a bone, a tusk, ivory, a pearl, nacre, a mollusc shell, a cuttlebone, a gladius, a corallite, a crustacean exoskeleton, a calcified fossil. According to one embodiment the natural material is selected from the group consisting of a bird eggshell, a tooth, a bone, a tusk, ivory, a pearl, nacre, or a calcified fossil. According to a preferred embodiment the natural material is a bird eggshell, preferably a quail eggshell, a chicken eggshell, a duck eggshell, a goose eggshell, or an ostrich eggshell. The eggshell may be provided separately or in the form of an egg comprising the eggshell.

The substrate can also be made from a metal. For the purpose of the present invention, the term "metal" refers to pure metals and alloys. Examples of suitable metals are iron, steel, aluminium, copper, magnesium, nickel, titanium, zinc, brass, bronze, palladium, rhodium, platinum, silver, or gold.

As used herein, the term "textile" refers to a product produced by methods such as by layering, plaiting, braiding, knotting, weaving, knitting, crocheting, or tufting. For the purpose of the present invention, the term "woven fabric" refers to a textile article produced by weaving, and, the term "nonwoven fabric" refers to a flat, flexible, porous sheet structure that is produced by interlocking layers or networks of fibres, filaments, or film-like filamentary structures. According to one embodiment, the textile comprises wool, silk, cotton, flax, jute, hemp, acetate, lyocell, modal, polyester, polyamide, aramid, nylon, spandex, lurex, sisal, asbestos, glass fibres, carbon fibres, or mixtures thereof.

The substrate may be permeable or impermeable for solvents, water, or mixtures thereof. According to one embodiment, the substrate is impermeable for water, solvents, or mixtures thereof. According to a preferred embodiment, the substrate is permeable for water, solvents, or mixtures thereof. Examples for solvents aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to one embodiment, the substrate is a planar substrate and comprises a first side and a reverse side. The term "planar substrate" in the meaning of the present invention refers to a flat substrate having a two-dimensional characteristic, i.e. the substrate has a first side and a reverse side. Examples of planar substrates are substrates in the form of a sheet, a mat, a film, a panel, or a tile.

In case the substrate is a paper, cardboard, containerboard, or plastic, it may comprise one or more additives.

According to one embodiment, the substrate comprises an optical brightener as additive in an amount of at least 0.001 wt.-%, preferably at least 0.1 wt.-%, more preferably at least 0.5 wt.-%, even more preferably at least 1 wt.-%, and most preferably at least 1.2 wt.-%, based on the total weight of the substrate. According to another embodiment, the optical brightener is present in an amount from 0.001 to 15 wt.-%, preferably from 0.1 to 10 wt.-%, more preferably from 0.5 to 8 wt.-%, even more preferably from 1 to 6 wt.-%, and most preferably from 1.2 to 4 wt.-%, based on the total weight of the substrate. In this context, the term "optical brightener" refers to a chemical compound that absorbs light in the ultraviolet and violet region, typically between 340 and 370 nm, of the electromagnetic spectrum, and re-emits light in the blue region, typically between 420 and 470 nm, thereby causing a whiting effect of a substrate, in which it is incorporated.

The most commonly used class of optical brightener compounds are derivates of stilbenes such as 4,4'-diamino-2,2'-stilbenedisulphonic acid. These optical brighteners absorb ultraviolet light within the range of 350 to 360 nm, and re-emit blue light at 400 to 500 nm with a maximum wavelength at 430 nm. The sulphonic acid groups contribute to the water solubility of the optical brightener, and thus, the affinity of the optical brightener for cellulose can be manipulated by changing the number of sulphonic acid groups. A disulphonic or divalent optical brightener is constituted of two sulphonic acid groups and is particularly suitable for hydrophobic fibres such as nylon, silk, and wool application at acidic pH. A tetrasulphonic or tetravalent optical brightener is constituted of four sulphonic groups, has a good water-solubility, and is particularly suitable for cellulosic fibre and paper application at neutral or alkaline pH. A hexasulphonic or hexavalent optical brightener is constituted of six sulphonic groups and has excellent solubility for surface coating application like photographic paper. Others classes of optical brighteners include derivatives of pyrazolin, cumarin, benzoxazol, naphthalimide, and pyrene.

According to one embodiment, the optical brightener is selected from the group consisting of stilbene derivates, pyrazolin derivates, cumarin derivates, benzoxazol derivates, naphthalimide derivates, pyrene derivates, and mixtures thereof, preferably the optical brightener is selected from the group consisting of derivatives of diaminostilbene-disulphonic acid, derivatives of diaminostilbenetetrasulphonic acid, derivatives of diaminostilbenehexasulphonic acid, 4,4'-diamino-2,2'-stilbenedisulphonic acid, 4 4'-bis (benzoxazolyl)-cis-stilbene, 2 5-bis(benzoxazol-2-yl)thiophene, 5-[(4-anilino-6-methoxy-1,3,5-triazin-2-yl)amino]-2-[(E)-2-[4-[(4-anilino-6-methoxy-1,3,5-triazin-2-yl) amino]-2-sulphonatophenyl]ethenyl]benzenesulphonate (leucophor PC), and mixtures thereof.

According to one embodiment, the substrate comprises an additive such as bioactive molecules, for example, enzymes, chromatic indicators susceptible to change in pH or temperature, fluorescent materials, dispersants, milling aids, surfactants, rheology modifiers, lubricants, defoamers, dyes, preservatives, pH controlling agents, or mixtures thereof.

According to one embodiment, the substrate comprises a mineral filler material as additive such as kaolin, silica, talc, precipitated calcium carbonate, modified calcium carbonate, ground calcium carbonate, or mixtures thereof.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier. "Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and water-insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, WO 00/39222 A1, or EP 2 264 108 A1. "Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

According to one embodiment, the substrate is a fibre based substrate comprising a polymer as additive such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulphonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, rhamsan, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof, homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof. Non-limiting examples of fibre based substrates are paper, cardboard, containerboard, textile, cellulose or nitrocellulose.

The substrate may also comprise a coating layer. For the purpose of the present invention, the term "coating layer" refers to a layer, covering, film, skin etc., formed, created, prepared etc., from a coating formulation which remains predominantly on one side of the substrate. The coating layer can be in direct contact with the surface of the substrate or, in case the substrate comprises one or more precoating layers and/or barrier layers, can be in direct contact with the top precoating layer or barrier layer, respectively.

According to one embodiment, the substrate comprises a coating layer comprising an optical brightener as additive in an amount of at least 0.001 wt.-%, preferably at least 0.1 wt.-%, more preferably at least 0.5 wt.-%, even more preferably at least 1 wt.-%, and most preferably at least 1.2 wt.-%, based on the total weight of the substrate. According to another embodiment, the optical brightener is present in an amount from 0.001 to 15 wt.-%, preferably from 0.1 to 10 wt.-%, more preferably from 0.5 to 8 wt.-%, even more preferably from 1 to 6 wt.-%, and most preferably from 1.2 to 4 wt.-%, based on the total weight of the substrate.

According to one embodiment, the substrate comprises a coating layer comprising an additive such as bioactive molecules, for example, enzymes, chromatic indicators susceptible to change in pH or temperature, fluorescent materials, dispersants, milling aids, surfactants, rheology modifiers, lubricants, defoamers, dyes, preservatives, pH controlling agents, or mixtures thereof.

According to one embodiment, the substrate comprises a coating layer comprising a mineral filler material as additive such as kaolin, silica, talc, precipitated calcium carbonate, modified calcium carbonate, ground calcium carbonate, or mixtures thereof.

According to one embodiment, the substrate comprises a coating layer comprising a polymer as additive such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulphonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, rhamsan, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof, homopolymers or copolymers of acrylic and/or methacrylic acids, itaconic acid, and acid esters, such as, e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof.

According to one embodiment, the substrate does not contain a salifiable alkaline or alkaline earth compound. A "salifiable" compound in the meaning of the present invention is defined as a compound that is capable of reacting with an acid to form a salt. Examples of salifiable compounds are alkaline or alkaline earth oxides, hydroxides, alkoxides, methylcarbonates, hydroxycarbonates, bicarbonates, or carbonates.

According to one embodiment, the substrate does not contain an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or mixtures thereof. According to another embodiment, the substrate does not contain a calcium carbonate-containing material.

Method Step b) and c)

According to step b) of the method of the present invention, a treatment composition A comprising a deliquescent salt is provided. The term "deliquescent salt" as used herein refers to a salt that has a high affinity for moisture and can collect gaseous water molecules from the atmosphere to form a mixture of the solid salt and liquid water, or an aqueous solution of the salt, until the substance is dissolved (cf. definition of "deliquescence", IUPAC, Compendium of Chemical Terminology Goldbook, version 2.3.3, 2014).

According to one embodiment, the term "deliquescent salt" as used herein refers to a salt that absorbs at least 16 g of $H_2O$/mol of salt, i.e. 1 mol of $H_2O$/mol of salt of water from the atmosphere, when stored for 24 h at 20° C. in an atmosphere with a water content of 14 g/m$^3$, to form a mixture of solid salt and liquid water or an aqueous solution of the salt.

According to one embodiment, the deliquescent salt is selected from the group consisting of chlorates, sulphates, halides, nitrates, carboxylates, and mixtures and hydrates thereof. According to a preferred embodiment, the deliquescent salt of composition A is selected from the group consisting of chlorates, sulphates, chlorides, bromides, iodides, nitrates, citrates, acetates, and mixtures and hydrates thereof. According to a most preferred embodiment, the deliquescent salt is selected from the group consisting of zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate, and mixtures and hydrates thereof.

According to one embodiment, treatment composition A comprises only one deliquescent salt. According to another embodiment, treatment composition A comprises more than one deliquescent salt. According to still another embodiment, treatment composition A comprises two or three deliquescent salts.

According to one embodiment, the treatment composition A does not contain an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or mixtures thereof.

According to one embodiment, the treatment composition A is provided in dry form. According to a preferred embodiment, the treatment composition A is provided in liquid form. For example, the treatment composition A may be provided in the form of an aqueous suspension or an aqueous solution, and preferably in the form of an aqueous solution. According to another embodiment of the present invention, the treatment composition A is provided in liquid form as an aqueous solution comprising a deliquescent salt, water, and a solvent. Suitable solvents are known in the art and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water. According to one embodiment, the solvent is methanol, ethanol, propanol, or a mixture thereof, and preferably ethanol.

According to one embodiment, the treatment composition A comprises the deliquescent salt in an amount from 0.1 to 100 wt.-%, based on the total weight of the treatment composition A, preferably in an amount from 1 to 80 wt.-%, more preferably in an amount from 3 to 60 wt.-%, and most preferably in an amount from 10 to 50 wt.-%.

According to one embodiment, the treatment composition A is provided in liquid form, preferably in the form of an aqueous solution, comprising the deliquescent salt in an amount from 0.1 to 90 wt.-%, based on the total weight of the treatment composition A, preferably in an amount from 1 to 80 wt.-%, more preferably in an amount from 3 to 60 wt.-%, and most preferably in an amount from 10 to 50 wt.-%.

According to one embodiment, the treatment composition A is provided in liquid form as an aqueous solution, comprising the deliquescent salt in the range of 10 to 90 wt.-%, and preferably in the range of 30 to 60 wt.-%, water in the range of 15 to 85 wt.-%, and preferably in the range of 25 to 50 wt.-%, and a solvent in the range of 1 to 50 wt.-%, and preferably in the range of 5 to 25 wt.-%. According to one embodiment, the solvent is methanol, ethanol, propanol, or a mixture thereof, and preferably ethanol.

According to step c) of the present invention, a treatment composition B comprising an acid or a salt thereof is provided.

According to one embodiment, the treatment composition B is provided in dry form. According to a preferred embodiment the treatment composition B is provided in liquid form. For example, the treatment composition B is provided in the form of an aqueous suspension or an aqueous solution, and preferably in the form of an aqueous solution.

According to one embodiment, the acid or the salt thereof is selected from the group of hydrochloric acid, sulphuric acid, sulphurous acid, phosphoric acid, oxalic acid, tartaric acid, salts thereof, bicarbonates, carbonates, and mixtures thereof.

According to another embodiment, the acid or the salt thereof is selected from the group of hydrochloric acid, sulphuric acid, sulphurous acid, phosphoric acid, oxalic acid, tartaric acid, salts thereof, alkaline bicarbonates and alkaline carbonates, and mixtures thereof.

According to a preferred embodiment, the acid or the salt thereof is selected from the group consisting of hydrochloric acid, sulphuric acid, sulphurous acid, phosphoric acid, oxalic acid, tartaric acid, salts thereof, lithium bicarbonate, sodium bicarbonate, potassium bicarbonate, lithium carbonate, sodium carbonate, potassium carbonate and mixtures thereof, and most preferably is selected from the group consisting of phosphoric acid, oxalic acid, tartaric acid and mixtures thereof.

The treatment composition may comprise one or more acids or salts thereof. According to one embodiment, the treatment composition B comprises only one acid or salt thereof. According to another embodiment, the treatment composition B comprises more than one acid or salt thereof. According to still another embodiment, the treatment composition B comprises two or three acids or salts thereof.

According to one embodiment, the treatment composition B comprises the acid or the salt thereof in an amount from 0.1 to 100 wt.-%, based on the total weight of the treatment composition B, preferably in an amount from 1 to 80 wt.-%, more preferably in an amount from 3 to 60 wt.-%, and most preferably in an amount from 10 to 50 wt.-%.

According to one embodiment, the treatment composition B is provided in liquid form, preferably in the form of an aqueous solution, comprising the acid or the salt thereof in an amount from 0.1 to 90 wt.-%, based on the total weight of the treatment composition B, preferably in an amount from 1 to 80 wt.-%, more preferably in an amount from 3 to 60 wt.-%, and most preferably in an amount from 10 to 50 wt.-%.

According to one embodiment, the treatment composition B comprises an acid. The acid may be deposited in concentrated form or in diluted form. According to one embodiment of the present invention, the treatment composition B comprises an acid and water. According to another embodiment of the present invention, the treatment composition B comprises an acid and a solvent. According to another embodiment of the present invention, the treatment composition B comprises an acid, water, and a solvent. Suitable solvents are known in the art and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water. According to one embodiment, the solvent is methanol, ethanol, propanol, or a mixture thereof, and preferably ethanol. According to one exemplary embodiment, the treatment composition B comprises phosphoric acid, water, and ethanol, in a weight ratio of 1:1:1.

According to one embodiment, the treatment composition B comprises the acid or the salt thereof in the range of 20 to 80 wt.-%, and preferably in the range of 30 to 50 wt.-%, water in the range of 15 to 75 wt.-%, and preferably in the range of 25 to 45 wt.-%, and the solvent in the range of 5 to 50 wt.-%, and preferably in the range of 15 to 35 wt.-%. According to one embodiment, the acid or salt thereof is phosphoric acid, oxalic acid, and/or tartaric acid, preferably phosphoric acid, and/or the solvent is methanol, ethanol, propanol, or a mixture thereof, and preferably ethanol.

According to one embodiment, the treatment composition A and/or the treatment composition B further comprises a printing ink, a pigmented ink, a colorant, a fluorescent dye, a phosphorescent dye, an ultraviolet absorbing dye, a near infrared absorbing dye, a thermochromic dye, a halochromic dye, metal salts, transition metal salts, magnetic particles, or a mixture thereof. Such additional compounds can equip the water-insoluble pattern with additional features, such as specific light absorption properties, electromagnetic radiation reflection properties, fluorescence properties, phosphorescence properties, magnetic properties, electric conductivity, whiteness, brightness and/or gloss.

According to one embodiment, the treatment composition B further comprises a metal salt or transition metal salt selected from the group of aluminium chloride, iron chloride and zinc carbonate. Preferably, the metal salt or transition metal salt may be present in an amount from 0.1 to 10 wt.-%, more preferably from 0.5 to 7 wt.-%, and most preferably from 1 to 5 wt.-%, based on the total weight of treatment composition B.

According to a further embodiment, the treatment composition A and/or the treatment composition B further comprises a dispersant, a surfactant, a rheology modifier, a lubricant, a defoamer, a biocide, a preservative, a pH controlling agent, a mineral filler material such as kaolin, silica, talc, or a polymeric binder.

According to one embodiment, treatment composition A and treatment composition B are provided in the form of a mixture. For example, the treatment composition A and the treatment composition B may be provided in the form of a dry powder blend or a premixed aqueous formulation. It is appreciated by the skilled person that in case the compositions are provided in the form of a premixed aqueous formulation, the amount of the deliquescent salt and the amount of the acid or salt thereof are preferably selected such that a pre-mature formation of the water-insoluble salt, i.e. a formation of the water-insoluble salt before being deposited on and/or within the substrate, does not take place. This may be achieved by selecting an ion concentration or ion activity of the respective cation and anion, which does not exceed the solubility product of the desired water-insoluble salt when multiplied with each other.

It is a requirement of the present invention, that the deliquescent salt of the treatment composition A and the acid or the salt thereof of the treatment composition B are selected such that the cation of the deliquescent salt and the anion of the acid or the salt thereof are capable of forming a water-insoluble salt in aqueous medium.

The skilled person will select an appropriate deliquescent salt and an appropriate acid or salt thereof, which are capable of forming a water-insoluble salt in aqueous medium when brought into contact, according to his general technical knowledge. Furthermore, water-insoluble salts are known in the art.

For example, it is known to the skilled person that the deliquescent salt calcium chloride and phosphoric acid will form water-insoluble calcium phosphate, the deliquescent salt silver nitrate and hydrochloric acid will form water-insoluble silver chloride, the deliquescent salt calcium chloride and sodium carbonate will form water-insoluble calcium carbonate, the deliquescent salt magnesium chloride and sodium bicarbonate will form water-insoluble magnesium carbonate, or the deliquescent salt and calcium chloride and sodium oxalate will form water-insoluble calcium oxalate.

According to one embodiment, the treatment composition A comprises calcium chloride and the treatment composition B comprises phosphoric acid. According to another embodiment, the treatment composition A comprises silver nitrate and the treatment composition B comprises hydrochloric acid. According to still another embodiment, the treatment composition A comprises calcium chloride and the treatment composition B comprises sodium carbonate. According to still another embodiment, the treatment composition A comprises magnesium chloride and the treatment composition B comprises sodium bicarbonate. According to still another embodiment, the treatment composition A comprises calcium chloride and the treatment composition B comprises sodium oxalate.

The skilled person will also select the concentration of the cation of the deliquescent salt and the anion of the acid or the salt thereof such that a water-insoluble salt is formed, i.e. the concentration of the cation of the deliquescent salt and the concentration of the anion of the acid or salt thereof exceeds the solubility product of the corresponding water-insoluble salt when multiplied.

Method Step d)

According to step d) of the method of the present invention, the treatment composition A and the treatment composition B are deposited onto at least one surface region of the substrate to form at least one water-insoluble pattern on and/or within a substrate, wherein the treatment composition A and the treatment composition B are at least partially contacted and are deposited simultaneously or consecutively in any order.

It is understood by the person skilled in the art that by at least partially contacting treatment composition A and treatment composition B, a water-insoluble salt is formed from the cation of the deliquescent salt and the anion of the acid or salt thereof, which results in a water-insoluble pattern on and/or within the substrate. In other words, the water-insoluble pattern comprises the water-insoluble salt formed from the cation of the deliquescent salt and the anion of the acid or salt thereof. Examples for water-insoluble salts that may be formed in the inventive method are calcium phosphate, magnesium phosphate, aluminium phosphate, iron phosphate, copper phosphate, calcium carbonate, iron carbonate, zinc carbonate, copper carbonate, silver chloride or calcium oxalate.

The water-insoluble pattern may be in the form of any preselected pattern. According to one embodiment, the water-insoluble pattern is a channel, a barrier, an array, a one-dimensional bar code, a two-dimensional bar code, a three-dimensional bar code, a security mark, a number, a letter, an alphanumerical symbol, a text, a logo, an image, a shape, a braille marking, or a design.

The water-insoluble pattern according to the present invention, may be formed on the substrate, i.e. on the surface of the substrate without permeating in the substrate. For example, this may be the case for non-porous materials such as metals. However, it is also possible that the water-insoluble pattern is formed within the substrate, for example, after absorption of the deposited treatment compositions into the bulk of a permeable substrate such as paper. The water-insoluble pattern may as well be formed within the substrate and on the surface of the substrate.

According to one embodiment, the water-insoluble pattern is formed on the substrate. According to another embodiment the water-insoluble pattern is formed within the substrate. According to a preferred embodiment, the water-insoluble pattern is formed on and within the substrate.

It is a requirement of the method of the present invention that the treatment composition A and the treatment composition B are deposited such that the treatment composition A and the treatment composition B are contacted at least partially.

In order to contact the treatment composition A and the treatment composition B at least partially the surface region of the substrate onto which treatment composition A is deposited may at least partially overlap with the surface region onto which the treatment composition B is deposited. According to a preferred embodiment, the surface region of the substrate onto which treatment composition B is deposited is completely located within the surface region of the substrate onto which treatment composition A is deposited.

According to one embodiment of the present invention, the surface region onto which the treatment composition A is deposited and the surface region onto which the treatment composition B is deposited overlap by at least 50%, preferably at least 75%, more preferably at least 90%, even more preferably at least 95%, and most preferably at least 99%.

In case the treatment composition A and the treatment composition B are deposited together in the form of a mixture, the surface region onto which the treatment composition A is deposited and the surface region onto which the treatment composition B are the same, i.e. they overlap by 100%.

In case the treatment composition A and the treatment composition B are deposited consecutively, the surface region onto which the treatment composition A is deposited and the surface region onto which the treatment composition B is deposited may differ in shape. For example, the surface region onto which the treatment composition A is deposited can be a filled area such as a square or rectangle and the surface region onto which the treatment composition B is deposited can be a two-dimensional bar code or a text. According to another exemplary embodiment, the surface region onto which the treatment composition A is deposited has the same shape as the surface region onto which the treatment composition B is deposited, but is oversized to allow some deviation which may occur during the inkjet print of the second pattern.

The treatment composition A and/or the treatment composition B may be deposited onto at least one surface region of the substrate. According to one embodiment, the treatment composition A and the treatment composition B are deposited onto one surface region of the substrate. According to another embodiment, the treatment composition A and the treatment composition B are deposited onto two or more surface regions of the substrate.

The treatment composition A and the treatment composition B may be deposited onto one side of the substrate or onto more than one side of the substrate. In case the substrate has a planar structure, the treatment composition A and the treatment composition B may be deposited onto the first side of the substrate and/or the reverse side of the substrate. In case a porous substrate having a planar structure is used, which is permeable for the treatment composition A and treatment composition B, it is also possible to form the water-insoluble pattern by depositing the treatment compositions onto opposite sides of the substrate.

According to one embodiment the substrate is a planar substrate having a first side and a reverse side, and the treatment composition A and the treatment composition B are deposited onto the first side of the substrate, or the treatment composition A and the treatment composition B are deposited onto the reverse side of the substrate.

According to another embodiment the substrate is a planar substrate having a first side and a reverse side, and the treatment composition A is deposited onto the first side of the substrate and treatment composition B is deposited onto the reverse side of the substrate, or the treatment composition B is deposited onto the first side of the substrate and treatment composition A is deposited onto the reverse side of the substrate. As required by the method of the present invention, the skilled person will deposit treatment compositions A and B such that treatment compositions A and B are at least partially contacted.

According to one embodiment, the treatment composition A and/or the treatment composition B is/are deposited by electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating and/or a pencil, preferably by inkjet printing or spray coating.

The treatment composition A and B may be deposited simultaneously or consecutively in any order.

According to one embodiment, step d) of the present invention comprises the steps of:

i) depositing the treatment composition A, and
ii) subsequently depositing the treatment composition B, wherein the treatment composition A is contacted at least partially with the treatment composition B.

According to another embodiment, step d) of the present invention comprises the steps of i) depositing the treatment composition B, and
ii) subsequently depositing the treatment composition A, wherein the treatment composition B is contacted at least partially with the treatment composition A.

In case that treatment composition A and treatment composition B are deposited simultaneously, it is possible to either deposit the compositions separately or in the form of a mixture.

According to one embodiment, treatment composition A and treatment composition B are deposited simultaneously in separate form. For example, it is possible to deposit treatment composition A and treatment composition B simultaneously by two different depositing means. In this context, "depositing means" refers to any means that are suitable for electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating and/or a pencil.

According to another embodiment, treatment composition A and treatment composition B are deposited simultaneously in the form of a mixture.

The treatment composition A and/or or the treatment composition B may be deposited in dry or in liquid form.

According to one embodiment the treatment composition A and/or the treatment composition B are deposited in dry form.

In case both treatment compositions are deposited in dry form, the gaseous water molecules absorbed by the deliquescent salt from the surrounding atmosphere, in which the method is carried out, may be sufficient to enable the formation of the water-insoluble salt, and thus, the water-insoluble pattern. Another possibility is that the residual moisture of the substrate, on which the method is carried out, may be absorbed by the deliquescent salt, and thereby may enable the formation of the water-insoluble salt, and thus, the water-insoluble pattern. However, in some cases it may be necessary to add water from an external source to enable the formation of the water-insoluble salt, and thus, the water-insoluble pattern.

According to one embodiment, during method step d) water is deposited from an external source. In other words, during step d) the treatment composition A and the treatment composition B are at least partially contacted in the presence of water. This may be achieved, for example, by spraying water onto the substrate with any common spraying means known in the art or by subjecting the substrate during or after step d) to water vapour.

According to another embodiment, the substrate is subjected during or after step d) to water vapour over a time period of from 1 s to 24 h, preferably from 5 s to 1 h, more preferably from 30 s to 30 min, and most preferably from 1 min to 10 min, in an atmosphere with an absolute humidity of from 1 $g/m^3$ to 100 $g/m^3$, preferably of from 3 $g/m^3$ to 80 $g/m^3$, more preferably from 5 $g/m^3$ to 60 $g/m^3$, and most preferably from 10 $g/m^3$ to 30 $g/m^3$. In this context, the "absolute humidity" is defined as the water content in the air expressed in gram per cubic meter. Hygrometers to measure the absolute humidity of the air are known to the person skilled in the art.

According to yet another embodiment, during method step d) the treatment composition A is subjected to residual moisture of the substrate. This may be the case, for example, if the substrate is a cellulosic fibre pulp, a pre-pressed fibre pulp, or other fibre based substrates such as a paper. It would also be possible to carry out the method of the present invention in a paper machine after the wire section, for example, in the pressing section or during the drying section.

According to one embodiment, the treatment composition A and the treatment composition B are provided in dry form and the substrate provided in step a) comprises water in an amount from 1 to 90 wt.-%, based on the total weight of the substrate, preferably from 10 to 60 wt.-%, based on the total weight of the substrate, and more preferably from 20 to 40 wt.-% based on the total weight of the substrate.

According to another embodiment, the treatment composition A or treatment composition B is provided in liquid form, and preferably treatment composition A and treatment composition B are provided in liquid form.

According to one embodiment, step d) of the present invention comprises the steps of:

i) depositing the treatment composition A, and
ii) subsequently depositing the treatment composition B, wherein the treatment composition A is provided in dry form and the treatment composition B is provided in liquid form, and the treatment composition A is contacted at least partially with the treatment composition B.

According to one embodiment, step d) of the present invention comprises the steps of:

i) depositing the treatment composition A, and
ii) subsequently depositing the treatment composition B, wherein the treatment composition A is provided in liquid form and the treatment composition B is provided in dry form, and the treatment composition A is contacted at least partially with the treatment composition B.

According to a preferred embodiment, step d) of the present invention comprises the steps of:

i) depositing the treatment composition A, and
ii) subsequently depositing the treatment composition B, wherein the treatment composition A and the treatment composition B are provided in liquid form, and the treatment composition A is contacted at least partially with the treatment composition B.

According to another embodiment, step d) of the present invention comprises the steps of i) depositing the treatment composition B, and
ii) subsequently depositing the treatment composition A, wherein the treatment composition B is provided in dry form and the treatment composition A is provided in liquid form, and the treatment composition B is contacted at least partially with the liquid treatment composition A.

According to another embodiment, step d) of the present invention comprises the steps of i) depositing the treatment composition B, and
ii) subsequently depositing the treatment composition A, wherein the treatment composition B is provided in liquid form and the treatment composition A is provided in dry form, and the treatment composition B is contacted at least partially with the liquid treatment composition A.

According to a preferred embodiment, step d) of the present invention comprises the steps of:

i) depositing the treatment composition B, and ii) subsequently depositing the treatment composition A, wherein the treatment composition A and the treatment composition B are provided in liquid form, and the treatment composition A is contacted at least partially with the treatment composition B.

According to one embodiment, treatment composition A and treatment composition B are deposited simultaneously in separate form, wherein treatment composition A and/or treatment composition B is/are provided in liquid form.

According to another embodiment, treatment composition A and treatment composition B are deposited simultaneously in the form of a mixture, wherein treatment composition A and treatment composition B are provided in liquid form.

For example, the treatment composition A and treatment composition B are deposited simultaneously in the form of a premixed aqueous solution.

According to one embodiment, the treatment composition A and/or treatment composition B is/are provided in liquid form and are deposited consecutively in any order by inkjet printing with a drop spacing of less than or equal to 1 000 μm. According to one embodiment the drop spacing is from 10 nm to 500 μm, preferably from 100 nm to 300 μm, more preferably from 1 μm to 200 μm, and most preferably from 5 μm to 100 μm. According to another embodiment, the drop spacing is less than 800 μm, more preferably less than 600 μm, even more preferably less than 400 μm, and most preferably less than 80 μm. According to still another embodiment, the drop spacing is less than 500 nm, more preferably less than 300 nm, even more preferably less than 200 nm, and most preferably less than 80 nm. The drop spacing can also be zero, which means that the drops perfectly overlap.

In case the treatment composition A and treatment composition B are provided in liquid form and are deposited consecutively onto the substrate by inkjet printing, the drop spacing of the treatment composition A and treatment composition B can be the same or can be different. According to one embodiment, the treatment composition A and treatment composition B are provided in liquid form and deposited consecutively in the form of drops, wherein the drop spacing of the treatment composition A and treatment composition B is different. According to one embodiment, the treatment composition A and treatment composition B are provided in liquid form and deposited consecutively in the form of drops, wherein the drop spacing of the treatment composition A and treatment composition B is different.

The skilled person will appreciate that by controlling the drop volume, the drop diameter can be controlled, and thus, the diameter of the area which is treated with the treatment composition A and/or treatment composition B. The distance between two successive drops is determined by the drop spacing. Therefore, by varying the drop volume and the drop spacing the resolution of the first pattern and the second pattern can be adjusted.

According to another embodiment, treatment composition A and/or treatment composition B are deposited onto the at least one surface region in an amount of from 1 to 250 $g/m^2$, preferably of from 5 to 200 $g/m^2$, more preferably of from 15 to 150 $g/m^2$, and most preferably of from 35 to 65 $g/m^2$.

According to one embodiment, the treatment composition A and/or treatment composition B is/are provided in liquid form and is/are deposited in the form of drops having a volume of less than or equal to 10 μl. According to one embodiment, the drops have a volume from 5 nl to 10 μl, preferably from 10 nl to 5 μl, more preferably from 50 nl to 2 μl, and most preferably from 200 nl to 750 nl. According to another embodiment, the drops have a volume of less than 10 μl, preferably less than 5 μl, more preferably less than 2 μl, and most preferably less than 750 nl.

According to another embodiment, the treatment composition A and/or treatment composition B is/are provided in liquid form and is/are deposited in the form of drops having a volume of less than or equal to 1 000 pl. According to one embodiment, the drops have a volume from 10 fl to 500 pl, preferably from 100 fl to 200 pl, more preferably from 500 fl to 100 pl, and most preferably from 1 pl to 30 pl. According to another embodiment, the drops have a volume of less than 1 000 pl, preferably less than 600 pl, more preferably less than 200 pl, even more preferably less than 100 pl, and most preferably less than 30 pl.

Additional Process Steps

The method according to the invention may further comprise additional process steps such as drying, rinsing or washing, and/or applying a protective and/or printing layer.

In case step d) of the inventive method comprises the steps i) and ii) defined above, the substrate may be dried after step i) and/or step ii). According to one embodiment, the substrate is dried after step i). According to another embodiment, the substrate is dried after step i) and step ii). According to a preferred embodiment, the substrate is dried after step ii). The drying can be carried out by any method known in the art, and the skilled person will adapt the drying conditions such as the temperature according to his process equipment. For example, the substrate can be dried by infrared drying and/or convection drying. The drying step may be carried out at room temperature, i.e. at a temperature of 20° C.±2° C. or at other temperatures. According to one embodiment, the drying is carried out at substrate surface region temperature from 25 to 150° C., preferably from 50 to 140° C., and more preferably from 75 to 130° C.

To remove remaining amounts of treatment composition A and/or treatment composition B after the water-insoluble pattern is formed, the at least one surface region may be washed or rinsed with aqueous solutions, preferably water. Washing or rinsing of the substrate's surface may be carried out before or after drying of the substrate's surface, and preferably before drying. According to one embodiment the at least one surface region of the substrate is washed or rinsed after step d). According to a preferred embodiment, the at least one surface region is washed or rinsed with water after step d).

The method according to the invention may further comprise a step e) of applying a protective layer and/or a printing layer above the water-insoluble pattern.

The protective layer can be made from any material, which is suitable to protect the underlying water-insoluble pattern against unwanted environmental impacts or mechanical wear. Examples for suitable materials are resins, varnishes, silicones, polymers, metal foils, or cellulose-based materials.

The protective layer may be applied above the substrate by any method known in the art and suitable for the material of the protective layer. Suitable methods are, for example, air knife coating, electrostatic coating, metering size press, film coating, spray coating, extrusion coating, wound wire rod coating, slot coating, slide hopper coating, gravure, curtain coating, high speed coating, lamination, printing, adhesive bonding, and the like.

According to one embodiment of the present invention, the protective layer is applied above the water-insoluble pattern and the surrounding substrate surface.

According to one embodiment, the protective layer is a removable protective layer. According to another embodiment of the invention, the method further comprises a step e) of applying a printing layer above the water-insoluble pattern.

The printing layer can be applied by any suitable printing technique known to the skilled person. For example, the printing layer can be created by inkjet printing, offset printing, rotogravure, flexography, or screen printing. According to one embodiment, the printing layer is an inkjet printing layer, an offset printing layer, a rotogravure printing layer, or a flexography printing layer. It will be appreciated by the skilled person that the amount of ink applied by printing techniques such as offset or rotogravure, is still far below the thickness of the formed water-insoluble pattern. In other words, the amount of ink is too low in order to fill the voids and to cause disappearing of the pattern. Thus, a water-insoluble pattern, which is partially or completely covered by a printing layer, may be still visible when viewed from a second angle relative to the surface of the substrate.

According to one embodiment of the present invention, method step d) is carried out two or more times using a different or the same liquid treatment composition. According to one embodiment, the substrate is a planar substrate having a first side and a reverse side, and method step d) carried out at least one time on the first side of the substrate, and/or at least one time on the reverse side of the substrate. Thereby, different patterns with different properties can be created.

The Patterned Substrate

According to one aspect of the present invention, a substrate comprising a water-insoluble pattern obtainable by a method according to the present invention, is provided.

According to a further aspect of the present invention, a substrate comprising a water-insoluble pattern is provided, wherein the substrate comprises at least one water-insoluble pattern comprising a water-insoluble salt, wherein the water-insoluble pattern is located on and/or within the substrate, and preferably on and within the substrate. Preferably, the water-insoluble salt is a water-insoluble halide, sulphate, sulphite, phosphate, carbonate, oxalate, tartrate or a mixture thereof, more preferably an alkaline earth phosphate, carbonate, oxalate, or tartrate, and most preferably calcium phosphate or calcium carbonate. Preferably, the substrate is a paper, cardboard, containerboard or plastic, and more preferably the substrate is a paper. Non-limiting examples of paper are eucalyptus fibre paper or cotton fibre paper.

The inventors have surprisingly found that by using the inventive method, it is possible to form a water-insoluble pattern on a variety of substrates without being limited to specific surface features of the substrate, such as specific components or fillers or a specific coating layer. Furthermore, the method according to the invention allows to form a water-insoluble pattern within porous substrates, and therefore is not limited to the surface of a substrate such as conventional printing and coating technology. Thus, a water-insoluble pattern can be formed that is less easy to reproduce by a potential counterfeiter.

Furthermore, the formed pattern can differ from the untreated external surface in tactility, surface roughness, gloss, light absorption, electromagnetic radiation reflection, fluorescence, phosphorescence, magnetic property, electric conductivity, whiteness and/or brightness. These distinguishable properties can be utilized to detect the pattern visually, tactilely, or at alternative conditions, for example, under UV light or near infrared light using an appropriate detector, and can render it machine readable.

By using the method according to the invention, it is also possible to provide a substrate with unprecedented chemical and/or biological functionalities in the form of a tailor-made pattern. Moreover, in case a substrate comprising an optical brightener is provided, the inventive method allows to change in the fluorescence intensity of the optical brightener in the surface region of the water-insoluble pattern. Thus, the water-insoluble pattern can be detected by irradiating the substrate with UV light, i.e. electromagnetic radiation having a wavelength from less than 400 to 100 nm, while it is invisible to the naked or unaided human eye at ambient or visible light, i.e. when irradiated with electromagnetic radiation having a wavelength from 400 to 700 nm. Thus, the method of the present invention provides the possibility of providing a substrate with a covert marking, which is invisible at ambient conditions but can be easily and immediately recognized under UV-light. The UV-visible pattern created by the method of the present invention has also the advantage that it is not possible to reproduce it by copying using a photocopy machine. The method of the present invention could also be used to permanently validate or invalidate tickets or documents in a discreet way.

According to one embodiment, the substrate is a paper, cardboard, containerboard or plastic, and preferably a paper, such as a eucalyptus fibre paper or cotton fibre paper, optionally comprising an optical brightener as additive. If an optical brightener is present, preferably, the optical brightener is present in an amount of at least 0.001 wt.-%, preferably at least 0.1 wt.-%, more preferably at least 0.5 wt.-%, even more preferably at least 1 wt.-%, and most preferably at least 1.2 wt.-%, based on the total weight of the substrate. According to another embodiment, the optical brightener is present in an amount from 0.001 to 15 wt.-%, preferably from 0.1 to 10 wt.-%, more preferably from 0.5 to 8 wt.-%, even more preferably from 1 to 6 wt.-%, and most preferably from 1.2 to 4 wt.-%, based on the total weight of the substrate.

The inventors also found that, if the colour of the substrate and the colour of the water-insoluble pattern are the same or similar, a hidden pattern can be formed. Without being bound to any theory, the inventors believe that due to different light scattering properties of the water-insoluble pattern and the surrounding surface of the substrate, the water-insoluble pattern may be invisible when viewed at a first angle relative to the surface of the substrate, and visible when viewed from a second angle relative to the surface of the substrate. According to one embodiment, the water-insoluble pattern is invisible when viewed at an angle from 80° to 100°, preferably about 90°, relative to the surface of the substrate, and visible when viewed at an angle from 10° to 50°, preferably from 20 to 30°, relative to the surface of the substrate. Preferably, the water-insoluble pattern is viewed under ambient light. The surface of the substrate relative to which the viewing angle is defined is the surface on which the water-insoluble pattern is applied, i.e. the at least one surface of the substrate. According to one embodiment, the water-insoluble pattern is invisible to the un-aided or naked human eye when viewed at a first angle relative to the surface of the substrate under ambient light, and visible to the un-aided or naked human eye when viewed at a second angle relative to the surface of the substrate under ambient light.

According to one embodiment, the water-insoluble pattern is invisible when illuminated at an angle from 80° to 100°, preferably about 90°, relative to the surface of the substrate, and visible when illuminated at an angle from 10° to 50°, preferably from 20 to 30°, relative to the surface of the substrate. According to one embodiment, the water-insoluble pattern is invisible to the un-aided or naked human eye when illuminated at a first angle relative to the surface of the substrate, and visible to the un-aided or naked human eye when illuminated at a second angle relative to the surface of the substrate.

According to one embodiment, the water-insoluble pattern is a hidden pattern, which is invisible when viewed at a first angle relative to the surface of the substrate, and visible when viewed from a second angle relative to the surface of the substrate. According to one embodiment, the water-insoluble pattern is invisible when illuminated at an angle from 80° to 100°, preferably about 90°, relative to the surface of the substrate, and visible when illuminated at an angle from 10° to 50°, preferably from 20 to 30°, relative to the surface of the substrate. According to one embodiment, the water-insoluble pattern is invisible to the un-aided or naked human eye when illuminated at a first angle relative to the surface of the substrate, and visible to the un-aided or naked human eye when illuminated at a second angle relative to the surface of the substrate.

A further advantage of the present invention is that the water-insoluble pattern may have an embossed structure due to the formation of the water-insoluble salt on the surface of the substrate. This may provide the possibility of haptically detecting the water-insoluble pattern on a substrate, which could be particular advantageous for blind people and partially sighted users. Thus, the method of the present invention may also be used to create a tactile pattern on a substrate. For example, the method of the present invention may be used to create tactile graphics such as tactile pictures, tactile diagrams, tactile maps, or tactile graphs, or it may be used to create a braille marking such as a braille text.

According to one embodiment a substrate obtainable by a method according to the present invention is provided, wherein the water-insoluble pattern is a tactile pattern, and preferably a braille marking. According to another embodiment, a method for creating a tactile pattern is provided, comprising the steps a) to d) of the present invention.

Moreover, the present invention provides the possibility to equip the water-insoluble pattern with additional functionalities by adding further compounds to the treatment compositions A and/or treatment composition B.

According to one embodiment, the water-insoluble pattern further comprises a fluorescent dye, a phosphorescent dye, an ultraviolet absorbing dye, a near infrared absorbing dye, a thermochromic dye, a halochromic dye, metal salts, transition metal salts, magnetic particles, or a mixture thereof.

According to one embodiment, the water-insoluble pattern further comprises a dispersant, a surfactant, a rheology modifier, a lubricant, a defoamer, a biocide, a preservative, a pH controlling agent, a mineral filler material such as kaolin, silica, talc, or a polymeric binder.

According to yet another embodiment, the water-insoluble pattern only consists of a water-insoluble salt.

According to one embodiment, the water-insoluble pattern comprises a security feature, a decorative feature and/or a functional feature, preferably a channel, a barrier, an array, a one-dimensional bar code, a two-dimensional bar code, a three-dimensional bar code, a security mark, a number, a letter, an alphanumerical symbol, a text, a logo, an image, a shape, a braille marking, or a design. In the present context, term "security feature" means that the feature is used for the purpose of authentication. The term "decorative feature" means that the feature is not provided primarily for authentication, but rather primarily for a graphical or decorative purpose. The term "functional feature" means that the feature is provided primarily to serve a chemical or biological purpose when contacted with fluids or solid materials.

According to one embodiment, the substrate comprising the water-insoluble pattern is coated with a protective layer and/or a printing layer above the water-insoluble pattern. According to another embodiment, the substrate comprising the water-insoluble pattern is coated with a protective layer and/or a printing layer above the water-insoluble pattern and the surrounding surface of the substrate.

Generally, the substrate comprising the water-insoluble pattern of the present invention may be employed in any product that is subject to counterfeiting, imitation or copying. Furthermore, the substrate comprising the water-insoluble pattern of the present invention may be employed in non-security or decorative products. The substrate comprising the water-insoluble pattern of the present invention may also be employed for analytical or diagnostic devices.

According to one aspect of the present invention, a product comprising a substrate of the present invention, is provided, wherein the product is a tool for bioassays, a microfluidic device, a lab-on-a-chip device, a paper-based analytical and/or diagnostic tool, a separation platform, a print medium, a packaging material, a data storage, a security document, a non-secure document, a decorative substrate, a perfume, a drug, a tobacco product, an alcoholic drug, a bottle, a garment, a container, a sporting good, a toy, a game, a mobile phone, a CD, a DVD, a blue ray disk, a machine, a tool, a car part, a sticker, a label, a tag, a poster, a passport, a driving licence, a bank card, a credit card, a bond, a ticket, a tax stamp, a banknote, a certificate, a brand authentication tag, a business card, a greeting card, a braille document, a tactile document, or a wall paper.

According to a further aspect, the use of a substrate comprising a water-insoluble pattern according to the present invention, is provided in tactile applications, in braille applications, in printing applications, in analytical applications, in diagnostic applications, in bioassays, in chemical applications, in electrical applications, in security devices, in overt or covert security elements, in brand protection, in micro lettering, in micro imaging, in decorative, artistic, or visual applications, or in packaging applications.

The scope and interest of the present invention will be better understood based on the following figures and examples which are intended to illustrate certain embodiments of the present invention and are non-limitative.

EXAMPLES

Figure 1:
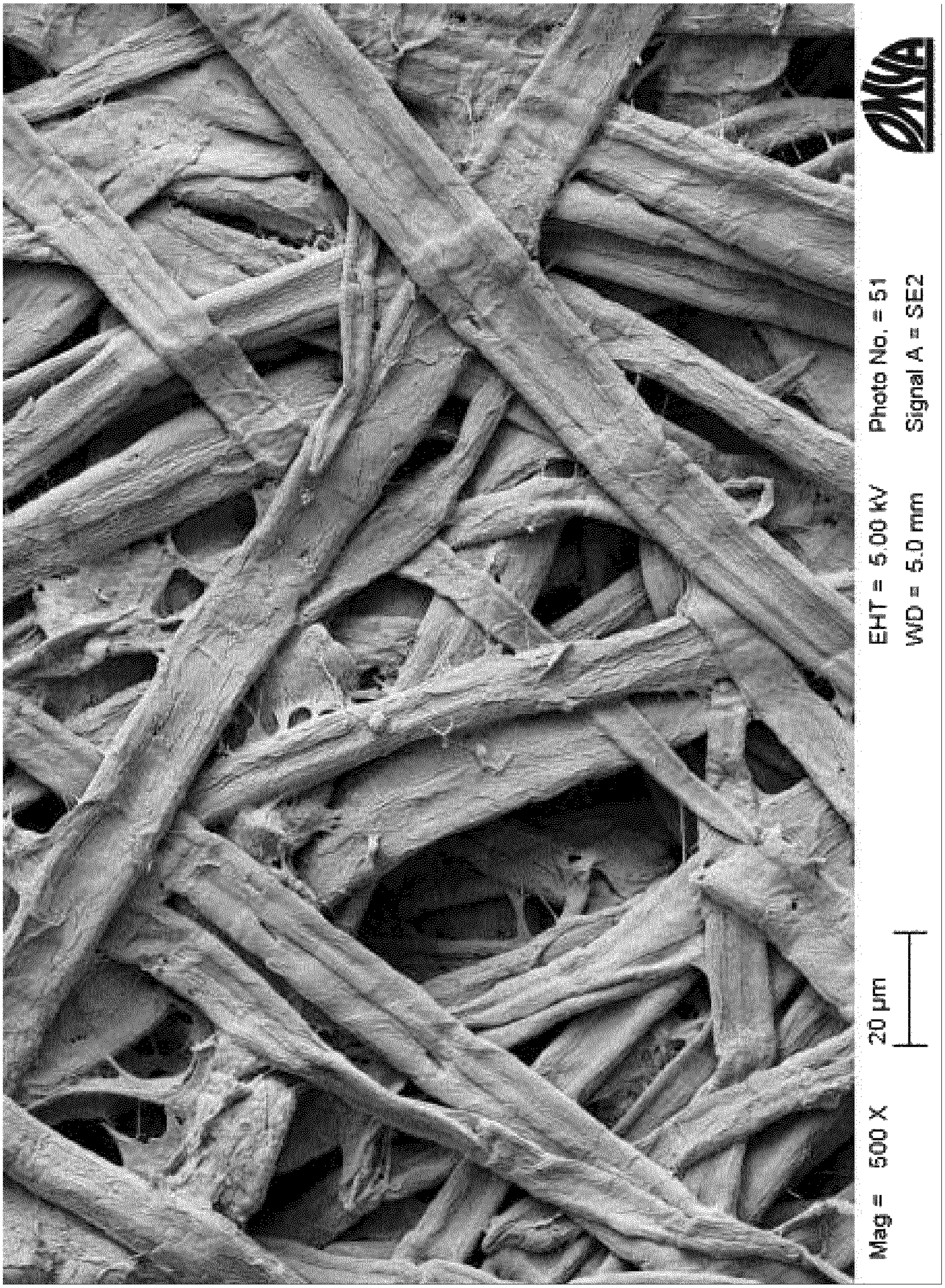
FIG. 1 shows a comparative SEM image of substrate 1 only treated with treatment composition A. No formation of a water-insoluble pattern is detected on the substrate.

In the following, measurement methods implemented in the examples are described.

1. Methods

Digital Photographs and Illumination

Images of the prepared samples were recorded with an EOS 600D digital camera equipped with a Canon Macro lens, EF-S 60 mm, 1:2.8 USM (Canon Japan).

For illumination a RB 5055 HF Lighting Unit (Kaiser Fototechnik GmbH & Co. KG, Germany) was used. The prepared samples were placed in the centre of the mid table of the lighting unit and were illuminated with one of the two lamps, wherein the distance between the substrates and the centre of the lamp was about 50 cm.

Scanning Electron Microscope (SEM) Micrographs

The prepared samples were examined by a Sigma VP field emission scanning electron microscope (Carl Zeiss AG, Germany) and a variable pressure secondary electron detector (VPSE) with a chamber pressure of about 50 Pa.

X-Ray Diffraction (XRD) Analysis

The prepared samples were analysed with a Bruker D8 Advance powder diffractometer obeying Bragg's law. This diffractometer consisted of a 2.2 kW X-ray tube, a sample holder, a $\vartheta$-$\vartheta$ goniometer, and a VANTEC-1 detector. Nickel-filtered Cu K$\alpha$ radiation was employed in all experiments. The profiles were chart recorded automatically using a scan speed of 0.7° per minute in 2$\vartheta$ (XRD GV 7600). The resulting powder diffraction pattern was classified by mineral content using the DIFFRAC$^{suite}$ software packages EVA and SEARCH, based on reference patterns of the ICDD PDF 2 database (XRD LTM_7603).

Quantitative analysis of the diffraction data, i.e. the determination of amounts of different phases in a multi-phase sample, has been performed using the DIFFRAC$^{suite}$ software package TOPAS (XRD LTM_7604). This involved modelling the full diffraction pattern (Rietveld approach) such that the calculated pattern(s) duplicated the experimental one.

Semi-Quantitative (SQ) calculations to estimate the rough mineral concentrations were carried out with the DIFFRAC$^{suite}$ software package EVA. The semi-quantitative analysis was performed considering the patterns relative heights and $I/I_{cor}$ values ($I/I_{cor}$: ratio between the intensities of the strongest line in the compound of interest and the strongest line of corundum, both measured from a scan made of a 50-50 (equal concentration) by weight mixture).

Energy-Dispersive X-Ray (EDS) Analysis

The prepared samples were examined by a Sigma VP field emission scanning electron microscope (Carl Zeiss AG, Germany). The backscattered electron images were recorded in COMPO-Mode with a chamber pressure of about 50 Pa in order to visualize differences in the chemical composition of the sample. The heavier the atomic weight of the elements present, the brighter the particle appears in the image.

The energy-dispersive X-ray images were recorded with an Oxford X-Max SDD-detector (Silicon Drift Detector) 50 mm$^2$ (Oxford Instruments PLC, United Kingdom) and chamber pressure about 40-90 Pa (40-60 Pa for surfaces/approx. 90 Pa for cross-sections). Dot-mappings and EDS-analysis were taken with the energy dispersive x-ray detector (EDS). The EDS-detector determines the chemical elements of a sample and can show the position of the elements in the sample.

X-Ray Fluorescence (XRF)

The XRF measurement was made with a Hitachi EA6000VX machine, with the following settings:

Voltage: 50 kV; Current: 1 000 µA; Filter: OFF; Collimator: 0.2×2 mm$^2$; Scan Size: 27.720, 13.440 mm; Image Size: 462×224 pixel; Pixel Size: 60 µm/pixel; Time per pixel: 10.00 ms.

2. Materials 2.1. Substrates

Substrate 1

60 g (dry) pulp (100% eucalyptus 30° SR) were diluted in 10 dm$^3$ tap water. The suspension was stirred for 30 minutes.

Subsequently, 0.06% (based on dry weight) of a polyacrylamide derivate (Percol® 1540, commercially available from BASF, Germany) was added as a retention aid and sheets of 80 $g/m^2$ were formed using the Rapid-Kothen hand sheet former. Each sheet was dried using the Rapid-Kothen drier.

Substrate 2

Cellulose pulp based, uncoated surface-glued, security paper containing a watermark, slightly yellowish, basis weight 130 $g/m^2$, containing minor amounts of calcium carbonate filler.

2.2. Treatment Compositions

Treatment Composition a 48.5 wt.-% calcium chloride, 9.9 wt.-% ethanol, and 41.6 wt.-% water (wt.-% values are based on the total weight of the treatment composition A).

Treatment Composition B 41 wt.-% phosphoric acid, 23 wt.-% ethanol, and 36 wt.-% water (wt.-% values are based on the total weight of the treatment composition B).

Treatment Composition C 38 wt.-% calcium chloride, 9.4 wt.-% ethanol, and 52.6 wt.-% water (wt.-% values are based on the total weight of the treatment composition C).

Treatment Composition D 4.9 wt.-% sulphuric acid, and 95.1 wt.-% water (wt.-% values are based on the total weight of the treatment composition D).

3. Examples

3.1. Examples 1 to 4

Examples 1 to 4 were carried out on substrate 1 with a contact angle dispenser (Dataphysics OCA 50, DataPhysics Instruments GmbH, Germany) with 0.5 µl droplets in a line with partial overlapping. The centre of applied droplets was about 1-2 mm over a distance of about 1 cm. The prepared samples were examined by SEM imaging.

Example 1 (Comparative)

Substrate 1 was treated with treatment composition A. No formation of a water-insoluble pattern was detected by SEM imaging (see FIG. 1).

Example 2 (Comparative)

Figure 2:
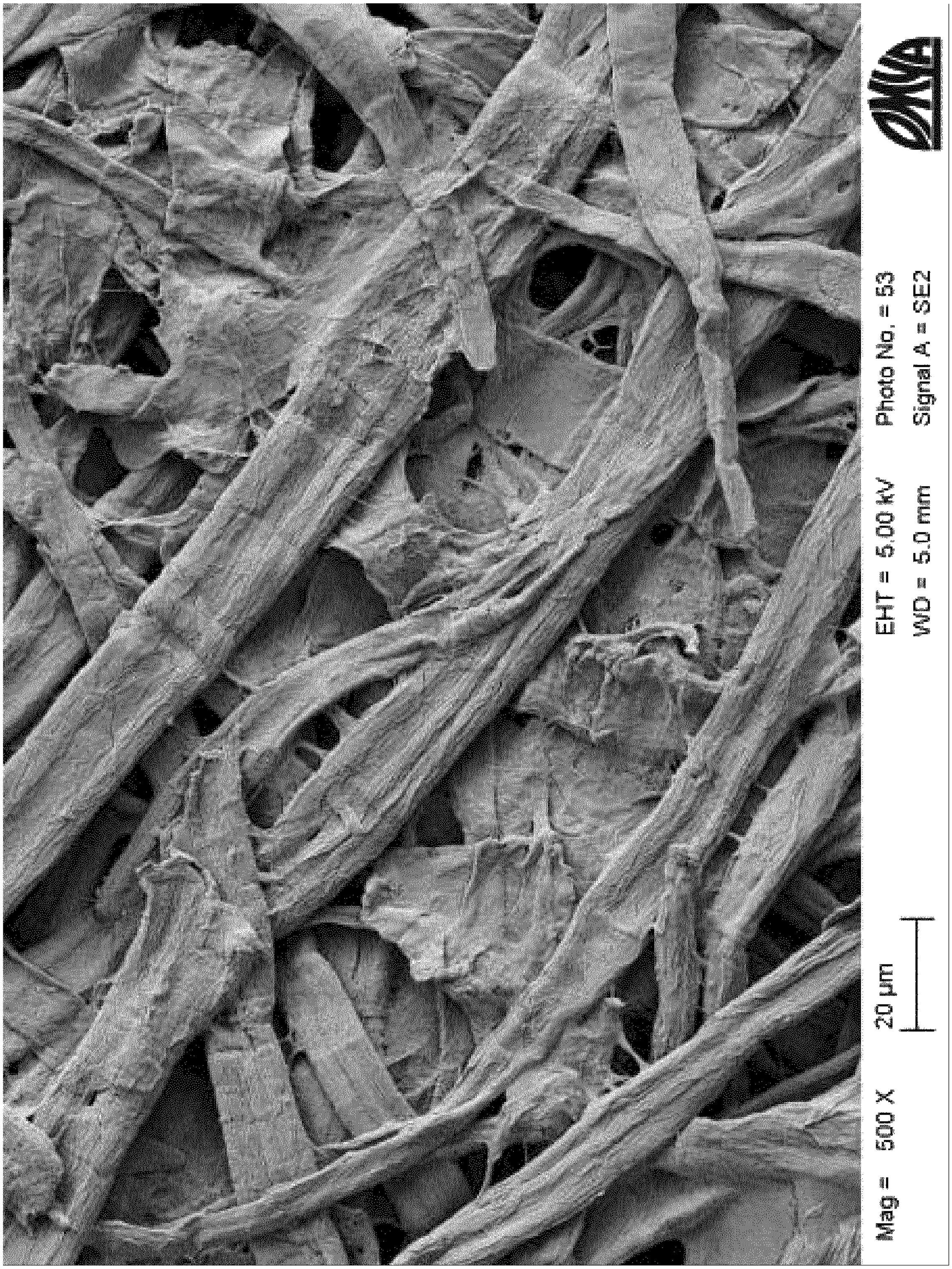
FIG. 2 shows a comparative SEM image of substrate 1 only treated with treatment composition B. No formation of a water-insoluble pattern is detected on the substrate.

Substrate 1 was treated with treatment composition B. No formation of a water-insoluble pattern was detected by SEM imaging (see FIG. 2).

Example 3

Figure 3:
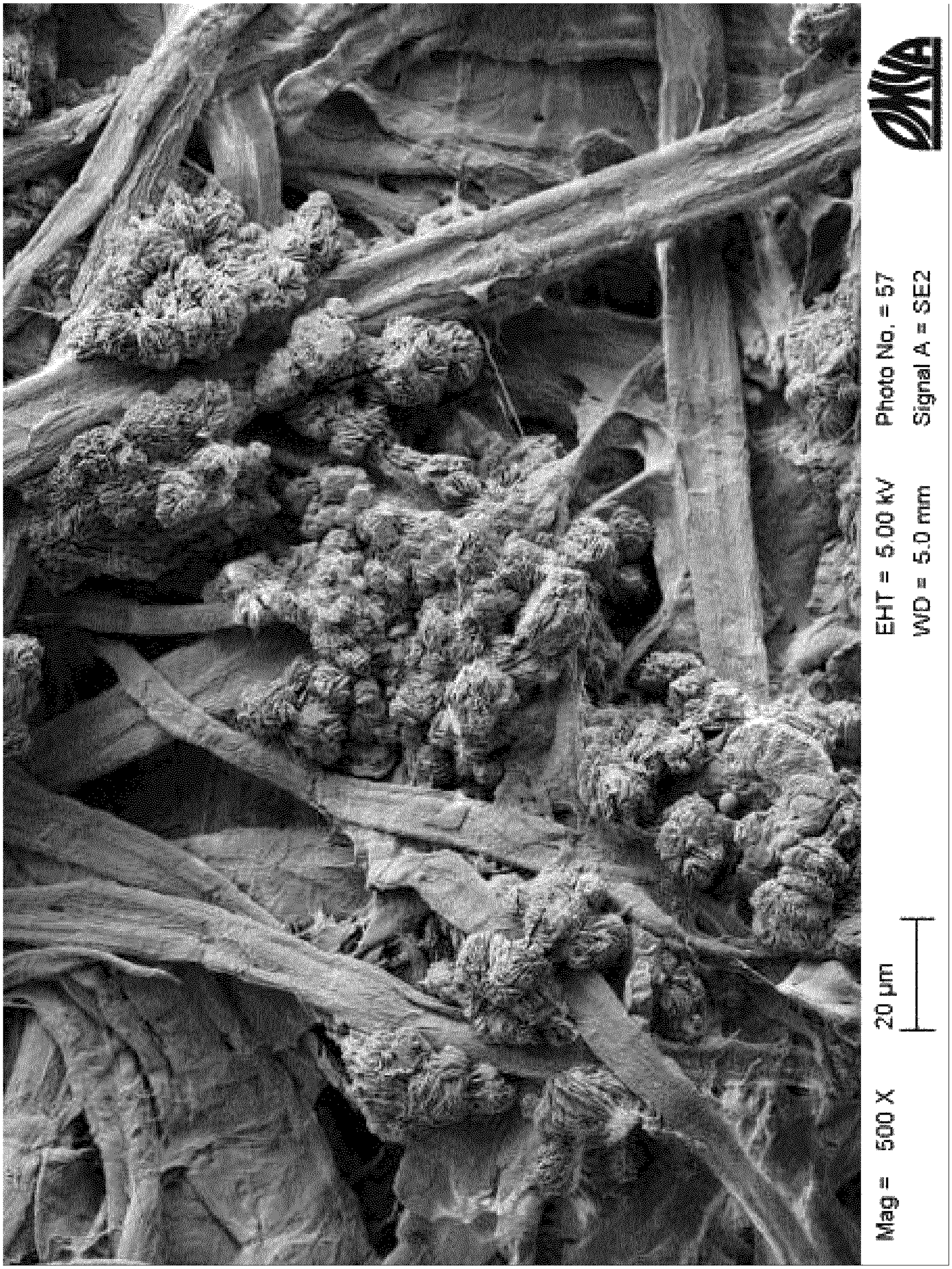
FIG. 3 shows a SEM image with high order of magnitude of substrate 1 treated first with treatment composition B followed by treatment composition A. Calcium phosphate salt pigments of the water-insoluble pattern are visible on and between the fibres of the substrate.
Figure 4:
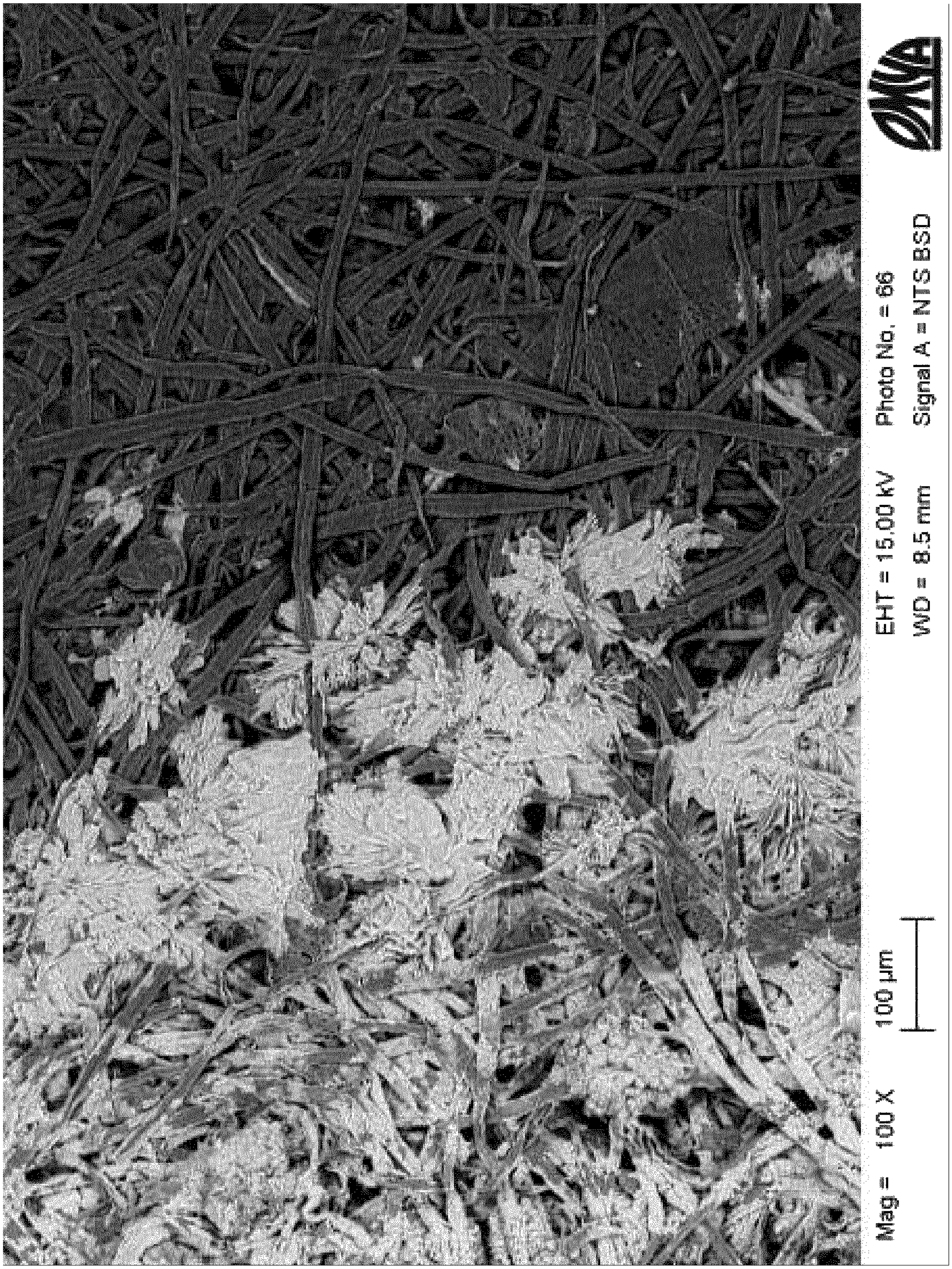
FIG. 4 shows a SEM image with low order of magnitude of substrate 1 treated first with treatment composition B followed by treatment composition A. The water-insoluble pattern on the left surface region of the substrate appears brighter than the untreated right surface region of the substrate.
Figure 5:
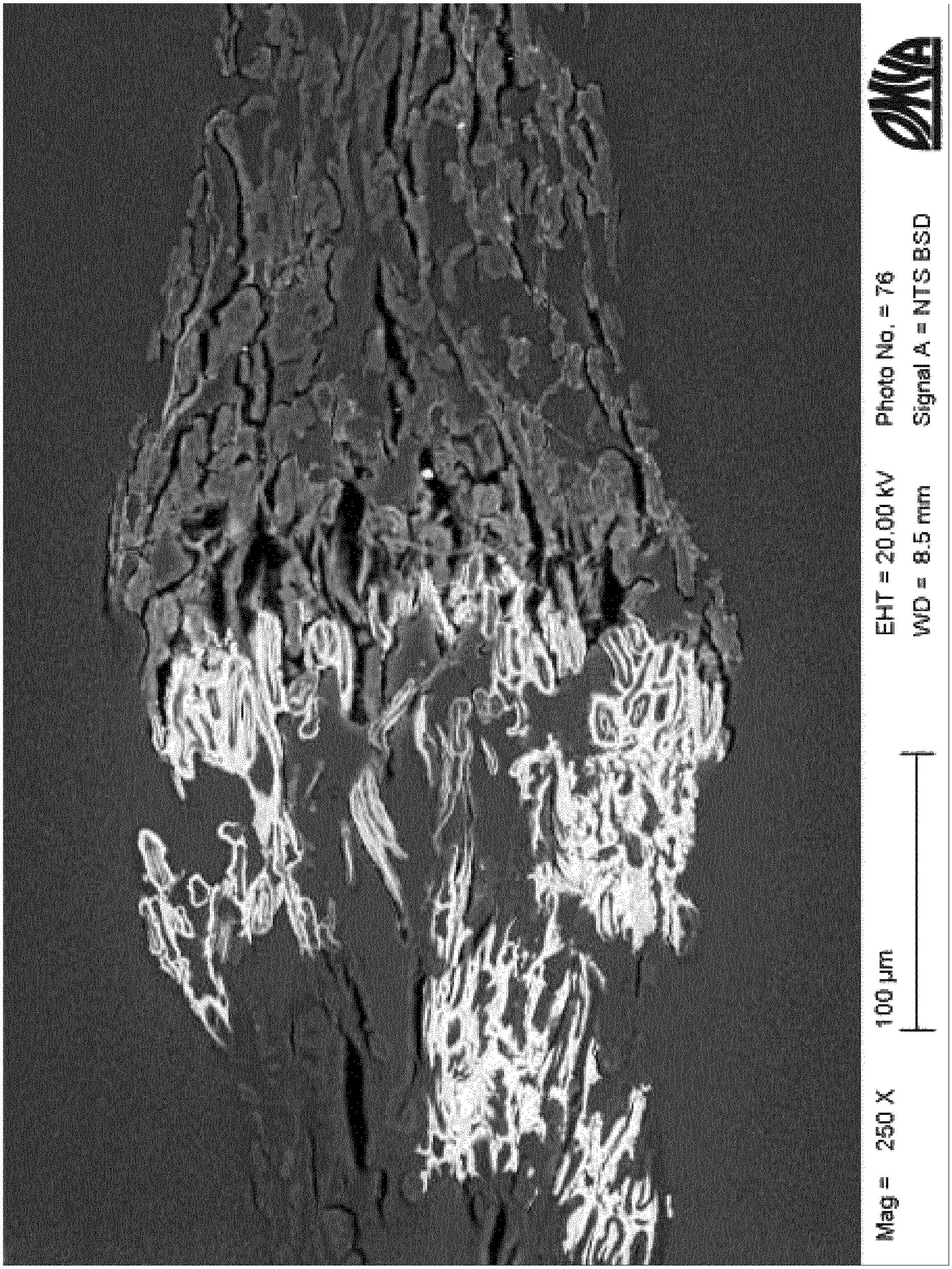
FIG. 5 shows a SEM image of a cross section of substrate 1 treated first with treatment composition B followed by treatment composition A. The water-insoluble pattern on the left surface region of the substrate appears brighter than the untreated right surface region.

Substrate 1 was treated first with treatment composition B, followed by treatment composition A about 15 minutes later. Calcium phosphate salt pigments of the water-insoluble pattern were detected by SEM imaging on and between the fibres of the substrate (see FIG. 3). The salt formation took place on a defined surface region of the substrate (see FIG. 4) and within the substrate (see FIG. 5). In FIGS. 4 and 5 the whitish regions correspond to the formed water-insoluble pattern, while the dark regions correspond to untreated substrate areas.

Example 4

Figure 6:
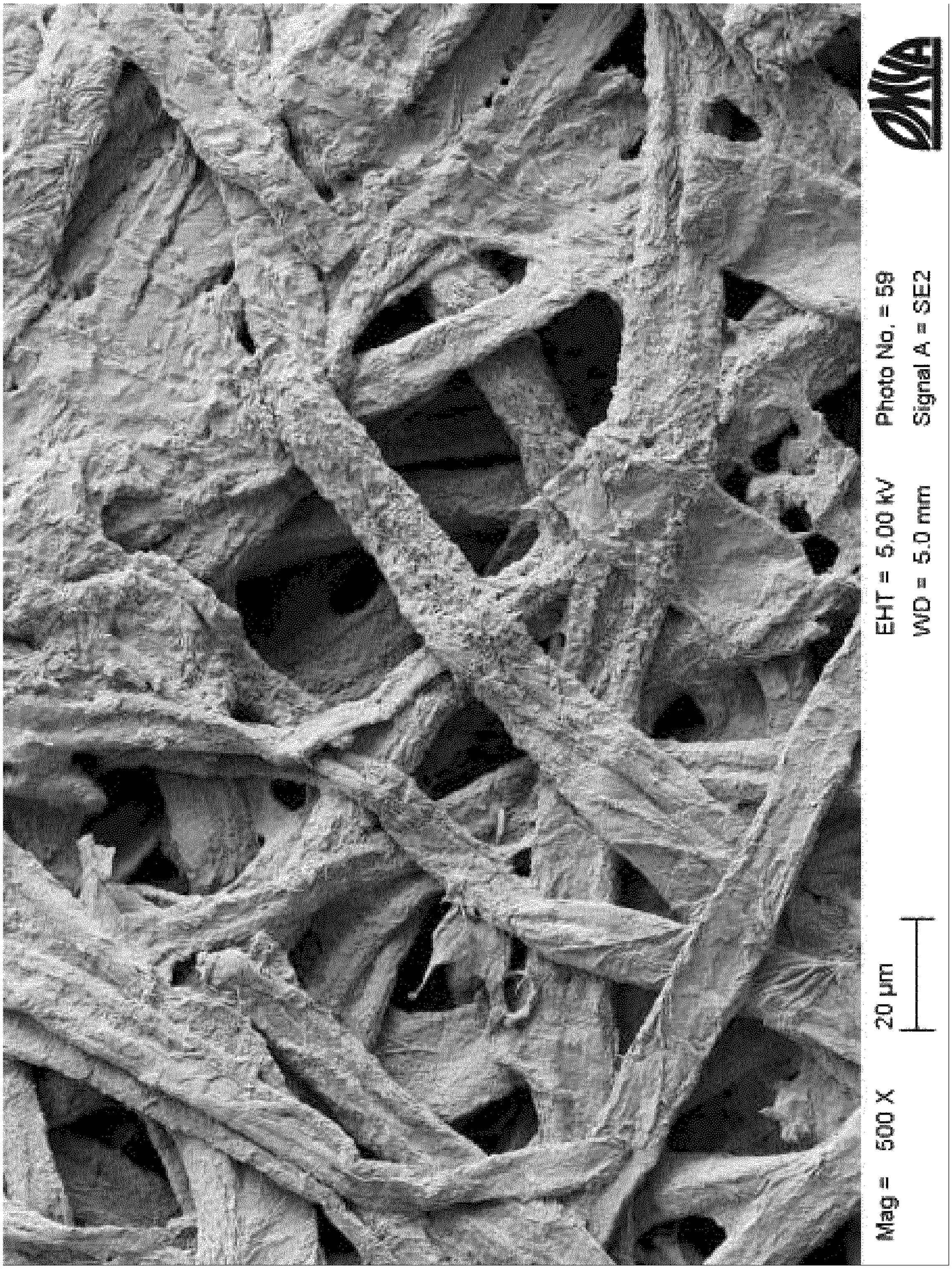
FIG. 6 shows a SEM image of substrate 1 treated first with treatment composition A followed by treatment composition B. Calcium phosphate salt pigments of the water-insoluble pattern are visible on the fibres of the substrate.

Substrate 1 was treated first with treatment composition A, followed by treatment composition B about 15 minutes later. Calcium phosphate salt pigments of the water-insoluble pattern were detected by SEM imaging on the fibres of the substrate (see FIG. 6).

3.2. Examples 5 to 7

Examples 5 to 7 were carried out on substrate 2 with an inkjet printer (Dimatix DMP 2831, Fujifilm Dimatix Inc., USA) with 10 pl droplet size at a drop spacing of 25 µm.

Example 5

Figure 7:
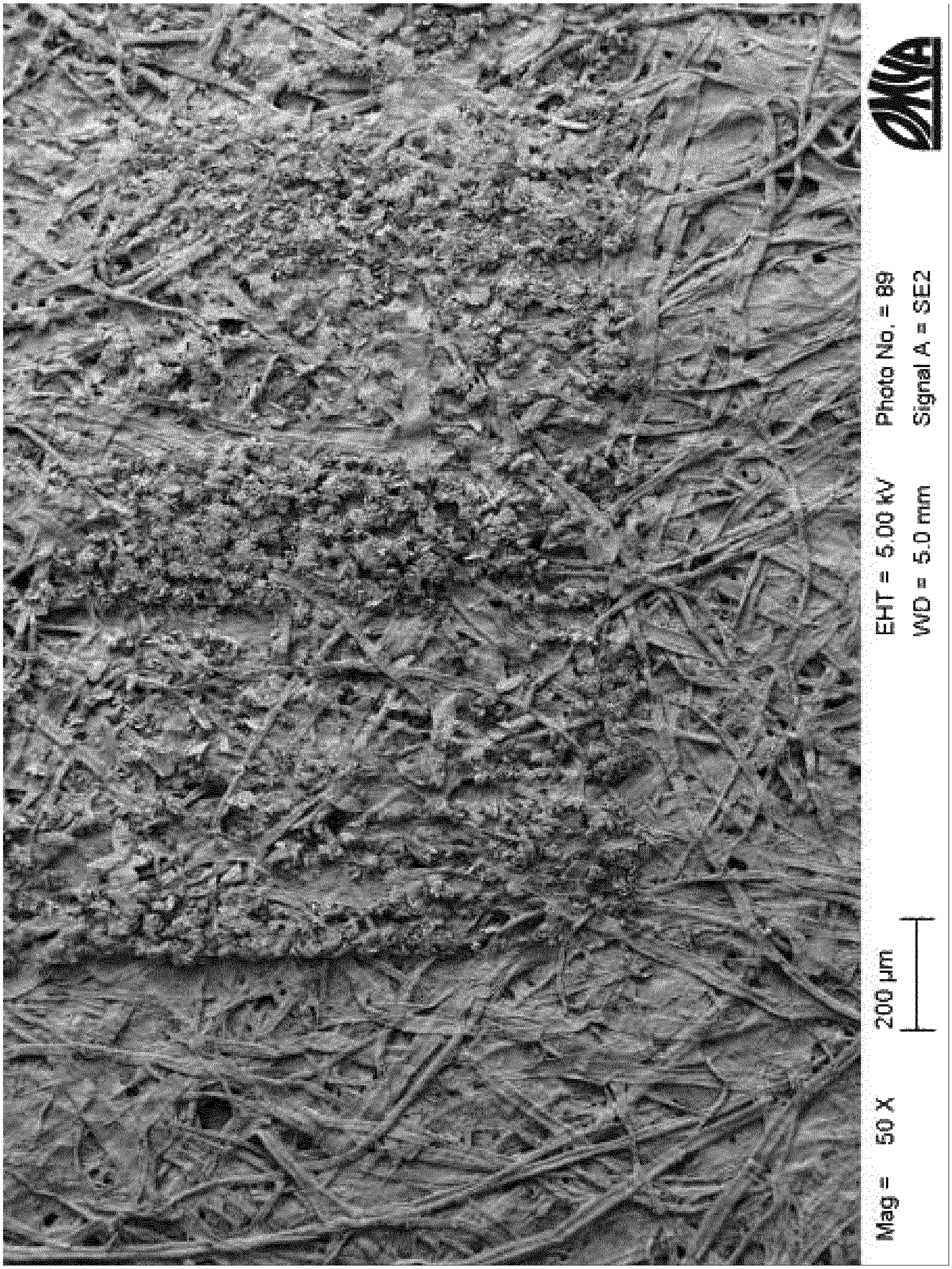
FIG. 7 shows a SEM image of substrate 2 treated first with treatment composition A followed by treatment composition B. Calcium phosphate salt pigments of the water-insoluble pattern are visible on and within the substrate.

Substrate 2 was inkjet printed in form of a pre-defined pattern with treatment composition A, followed by treatment composition B about 15 minutes later. Calcium phosphate salt pigments of the water-insoluble pattern were detected by SEM imaging on and within the substrate (see FIG. 7).

Example 6

Figure 8:
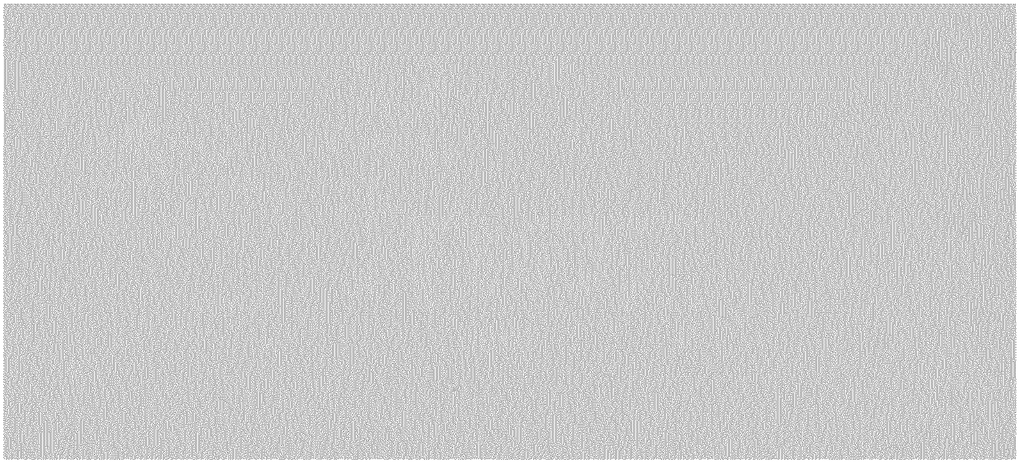
FIG. 8 shows a digital camera image of a treated substrate 2 taken from a top view under ambient light conditions. The substrate was treated first with treatment composition A followed by treatment composition B. The water-insoluble pattern formed on the substrate in the form of a logo (mozaiq) is almost invisible.
Figure 9:
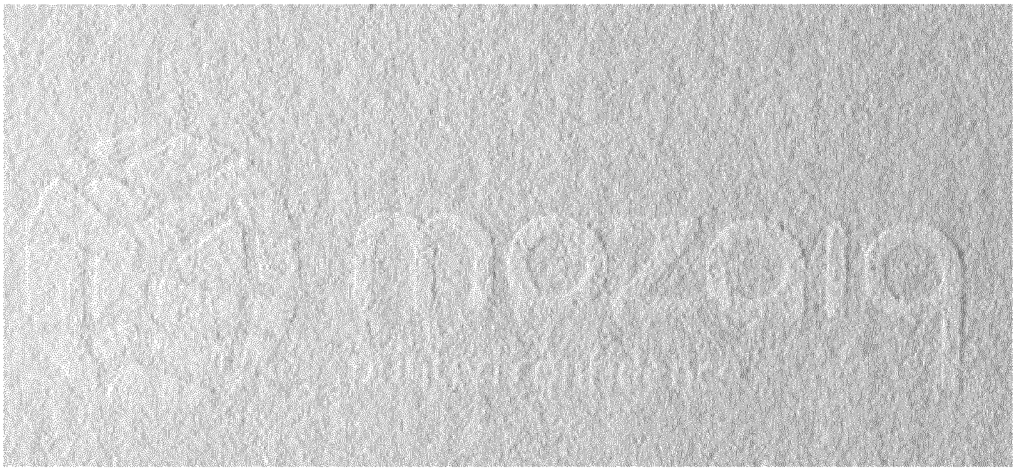
FIG. 9 shows a digital camera image of a treated substrate 2 taken from a top view with side light illumination at an angle of 20° relative to the surface of the substrate. The substrate was treated first with treatment composition A followed by treatment composition B. The water-insoluble pattern formed on the substrate in the form of a logo (mozaiq) is visible.

Substrate 2 was inkjet printed in the form of a logo (mozaiq) with treatment composition A followed by treatment composition B about 15 minutes later. The water-insoluble pattern, i.e. the logo, was invisible to the naked eye from a top view on the substrate under ambient light conditions (see FIG. 8). However, the logo became visible to the naked eye from a top view when illuminated with side light at an angle of 20° relative to the surface of the substrate (see FIG. 9). The good visibility of the water-insoluble pattern in the latter case is due to different light scattering of the calcium phosphate pigments on and within the substrate.

Example 7

Substrate 2 was inkjet printed in the form of 6 separate squares (surface area 1×1 $cm^2$). In case of square 1 to 4, treatment composition A was deposited first followed by the corresponding treatment composition B about 15 minutes later. In case of squares 1 to 3 a tracer (iron chloride, aluminium chloride, zinc carbonate) was included. The composition of the printed squares is indicated in Table 1 below.

The squares were treated with the following combination of treatment compositions:

Square 1 was printed with treatment composition A, followed by printing with treatment composition B additionally comprising 1 wt.-% iron chloride, based on the total weight of treatment composition B.

Square 2 was printed with treatment composition A, followed by printing with treatment composition B additionally comprising 1 wt.-% aluminium chloride, based on the total weight of treatment composition B.

Square 3 was printed with treatment composition A, followed by printing with treatment composition B additionally comprising 5 wt.-% zinc carbonate based on the total weight of liquid composition B.

Square 4 was printed with treatment composition A, followed by printing with treatment composition B.

Square 5 was printed with treatment composition A only.

Square 6 was printed with treatment composition B only.

TABLE 1

| Composition of the printed squares. | | | |
|---|---|---|---|
| Printed square | Treatment composition B | Treatment composition A | Tracer |
| 1 | Phosphoric acid | Calcium chloride | Iron chloride |
| 2 | Phosphoric acid | Calcium chloride | Aluminium chloride |
| 3 | Phosphoric acid | Calcium chloride | Zinc carbonate |
| 4 | Phosphoric acid | Calcium chloride | — |
| 5 (comparative) | — | Calcium chloride | — |
| 6 (comparative) | Phosphoric acid | — | — |

Figure 10:
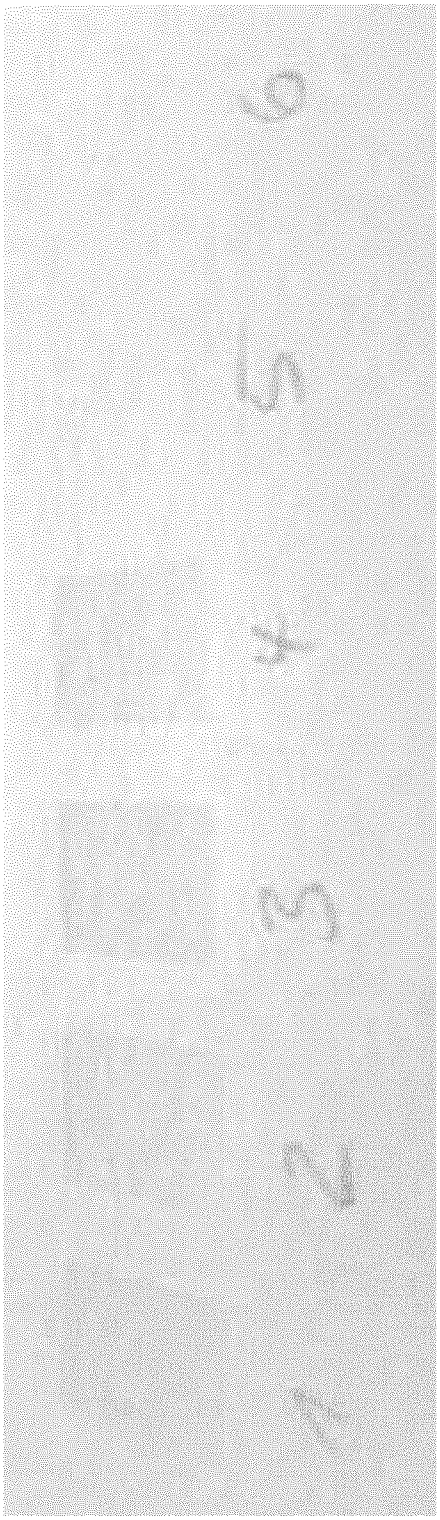
FIG. 10 shows a digital camera image of a treated substrate 2 taken from a side view under ambient light conditions. The substrate was treated on different surface regions in the form of squares 1 to 6. The surface regions of square 1 to 4 were first treated with treatment composition A followed by different treatment compositions B. The surface region of square 5 was only treated with treatment composition A. The surface region of square 6 was only treated with treatment composition B. The water-insoluble pattern in square 1 to 4 are visible.

Under ambient light conditions, the printed squares 1 to 4 were visible to the naked eye from a side view due to different light scattering of the calcium phosphate salt pigments of the water-insoluble pattern on and within the substrate (see FIG. 10).

The printed squares were also examined by XRF and the results of the element mapping are compiled in Table 2 below.

TABLE 2

| Results of XRF measurements (+indicates the presence of an element). | | | | | | |
|---|---|---|---|---|---|---|
| Element | Square 1 | Square 2 | Square 3 | Square 4 | Square 5 (comparative) | Square 6 (comparative) |
| Phosphorus | + | + | + | + | − | + |
| Calcium | + | + | + | + | + | − |
| Chlorine | + | + | + | + | + | − |
| Iron | + | − | − | − | − | − |
| Zinc | − | − | + | − | − | − |

The XRF measurements confirmed the presence of phosphorus, calcium and chlorine on squares 1 to 4 prepared according to the present invention.

Figure 11:
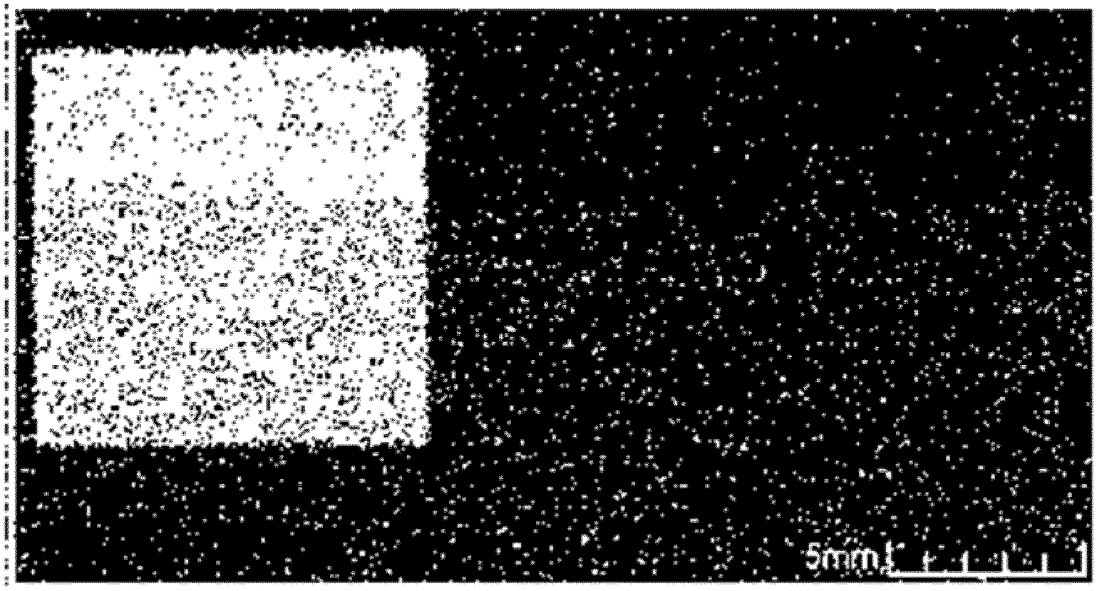
FIG. 11 shows XRF mapping for iron of squares 1 and 2 of example 7 with fluorescence in square 1.
Figure 12:
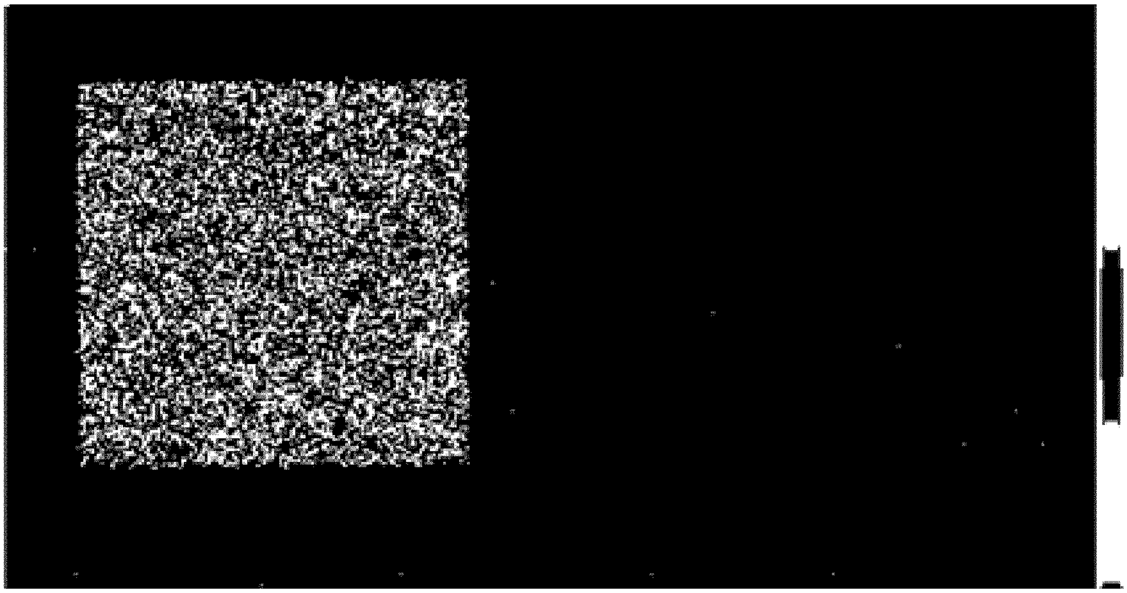
FIG. 12 shows XRF mapping for zinc of squares 3 and 4 of example 7 with fluorescence in square 3.

Furthermore, the results of the XRF measurements confirmed that the iron tracer and the zinc tracer can be detected in the printed squares. A map of iron of squares 1 and 2 is shown in FIG. 11. While the iron tracer in square 1 was clearly detectable (see FIG. 11, left), square 2 does not show the presence of iron (see FIG. 12, right). A map of zinc of squares 3 and 4 is shown in FIG. 12. While the zinc tracer in square 3 was clearly detectable (see FIG. 12, left), square 4 does not show the presence of zinc (see FIG. 12, right).

3.3. Examples 8 and 9

Examples 8 and 9 were carried out on substrate 1 with a contact angle dispenser (Dataphysics OCA 50, DataPhysics Instruments GmbH, Germany) with 0.5 µl droplets in a line with partial overlapping. The centre of applied droplets was about 1-2 mm over a distance of about 1 cm. The prepared samples were examined by SEM imaging.

Example 8

Figure 13:
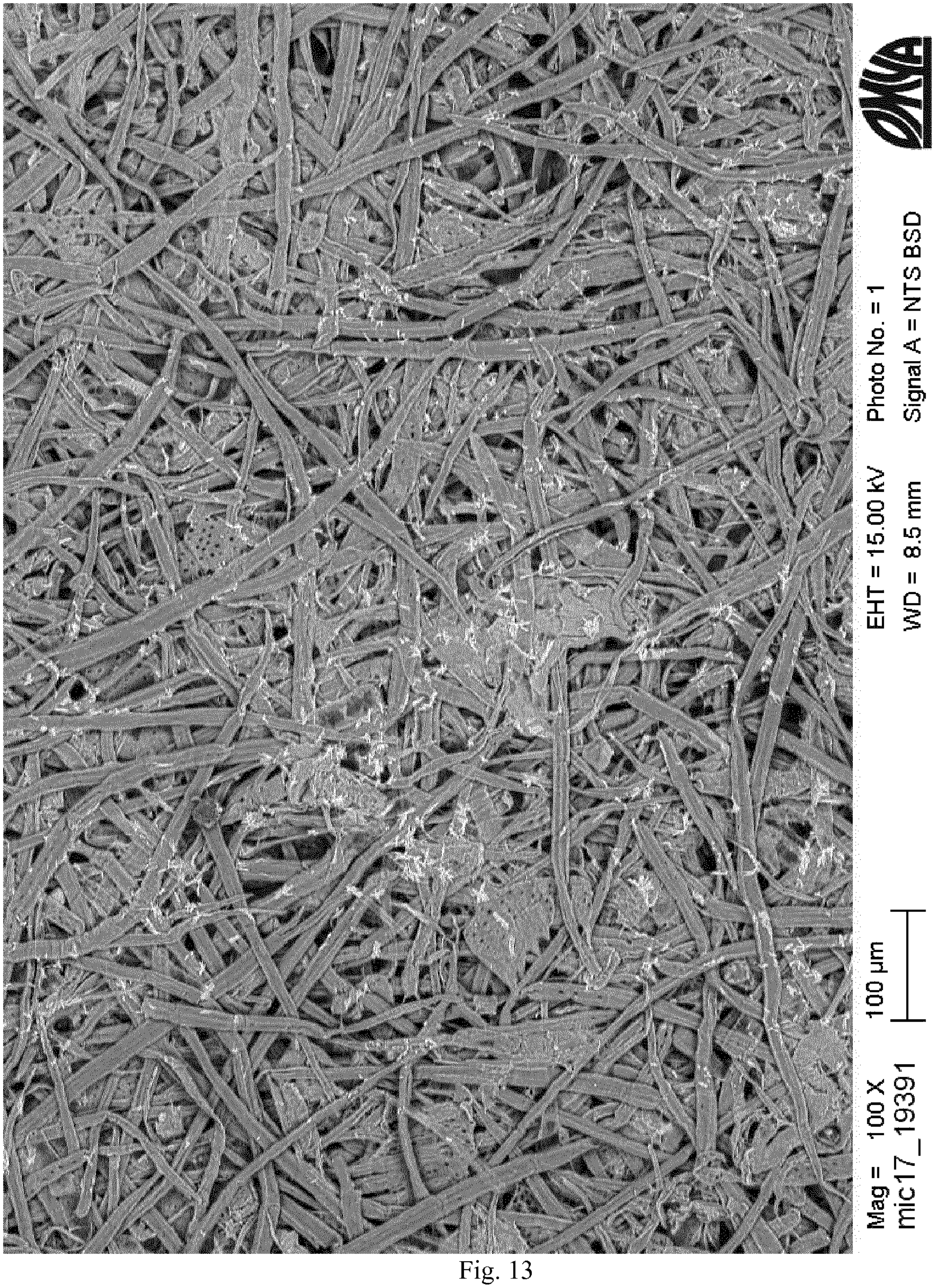
FIG. 13 shows a SEM image of substrate 1 treated first with treatment composition D followed by treatment composition C. Calcium sulphate salt pigments of the water-insoluble pattern are visible on and between the fibres of the substrate.
Figure 14:
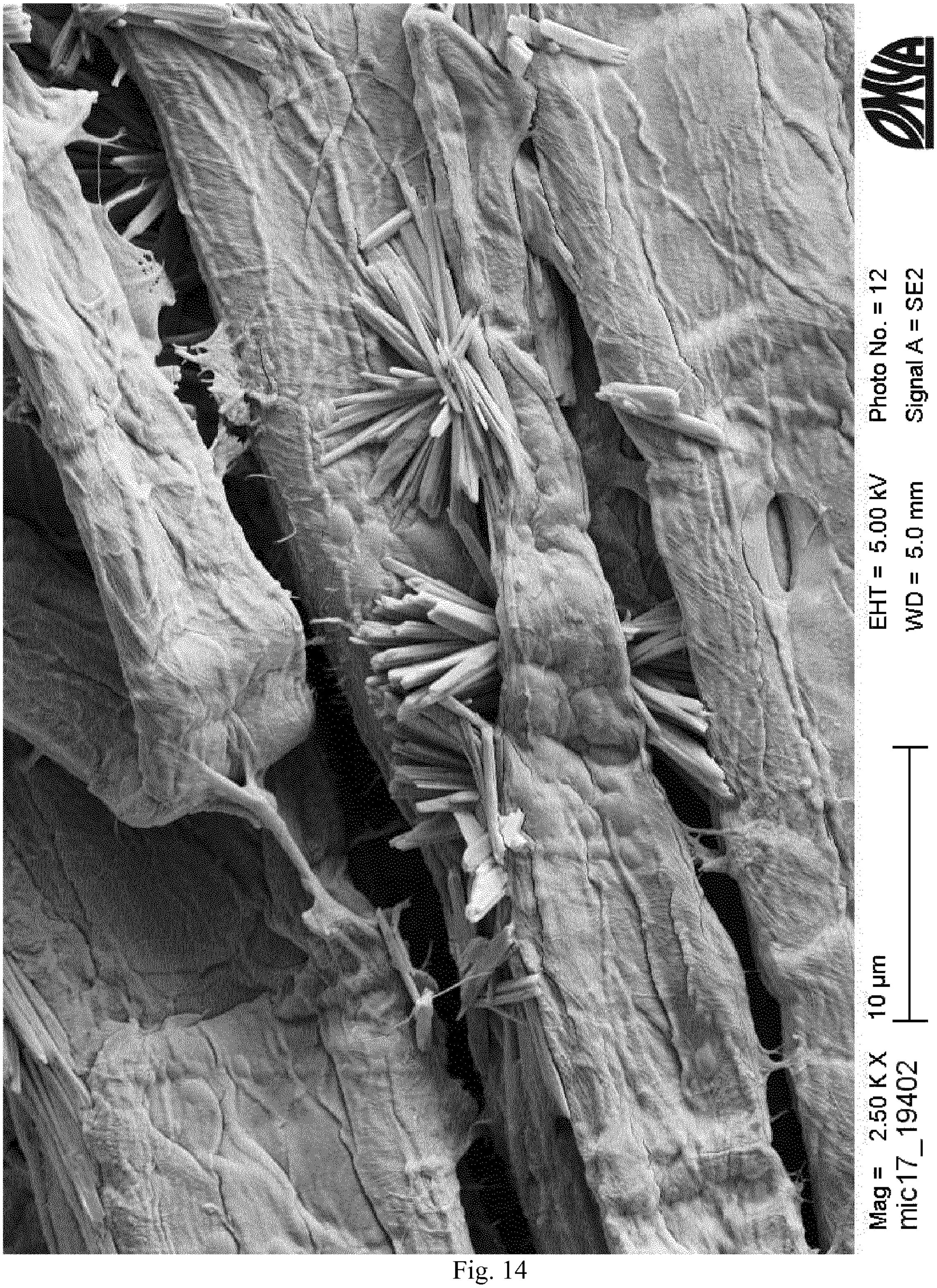
FIG. 14 shows a SEM image with high order of magnitude of substrate 1 treated first with treatment composition D followed by treatment composition C. Calcium sulphate salt pigments of the water-insoluble pattern are visible on and between the fibres of the substrate.

Substrate 1 was treated first with treatment composition D, followed by treatment composition C about 15 minutes later. Calcium sulphate salt (gypsum) pigments of the water-insoluble pattern were detected by SEM imaging on and between the fibres of the substrate (see FIGS. 13 and 14).

Example 9

Figure 15:
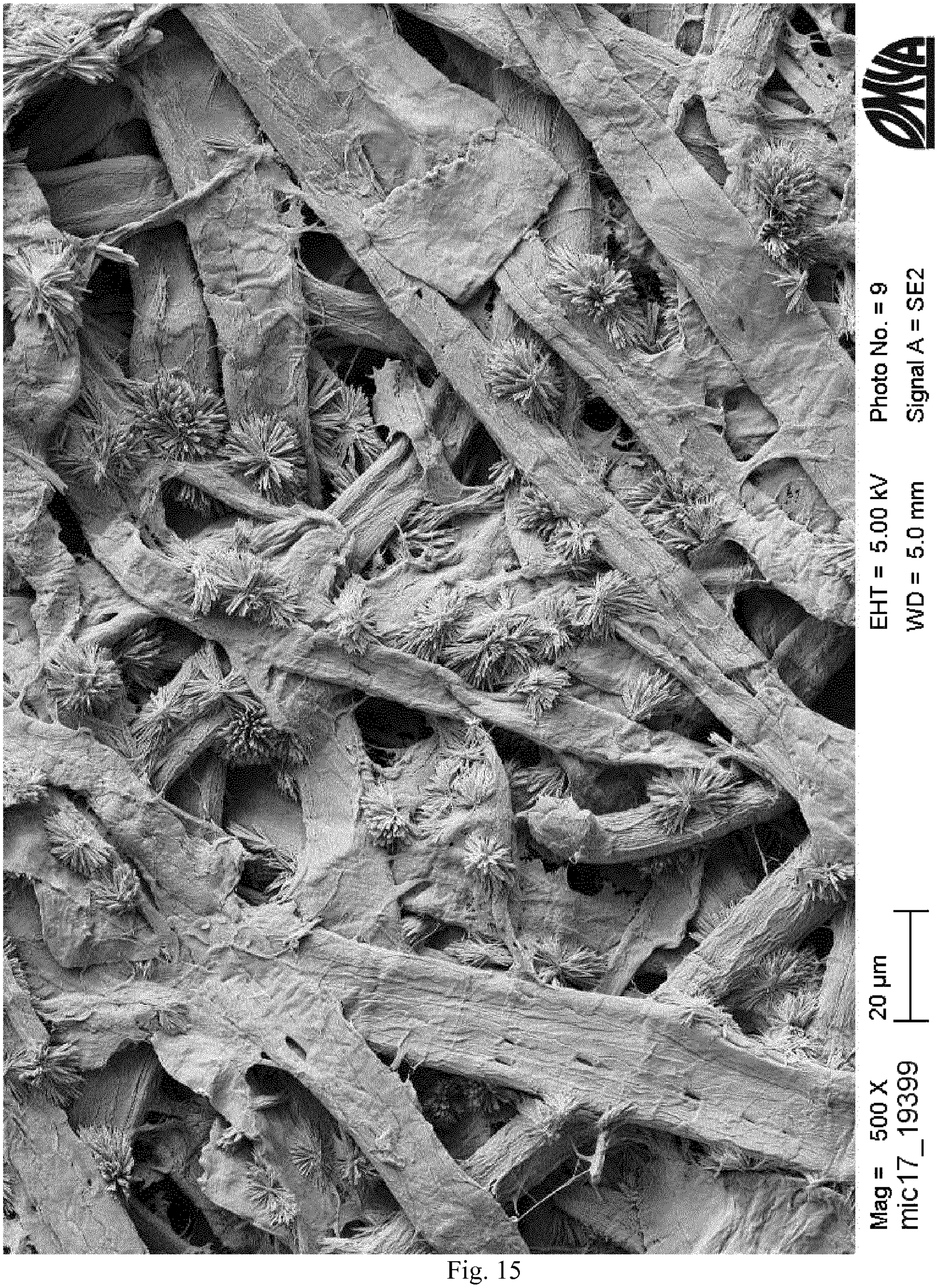
FIG. 15 shows a SEM image of substrate 1 treated first with treatment composition C followed by treatment composition D. Calcium sulphate salt pigments of the water-insoluble pattern are visible on the fibres of the substrate.
Figure 16:
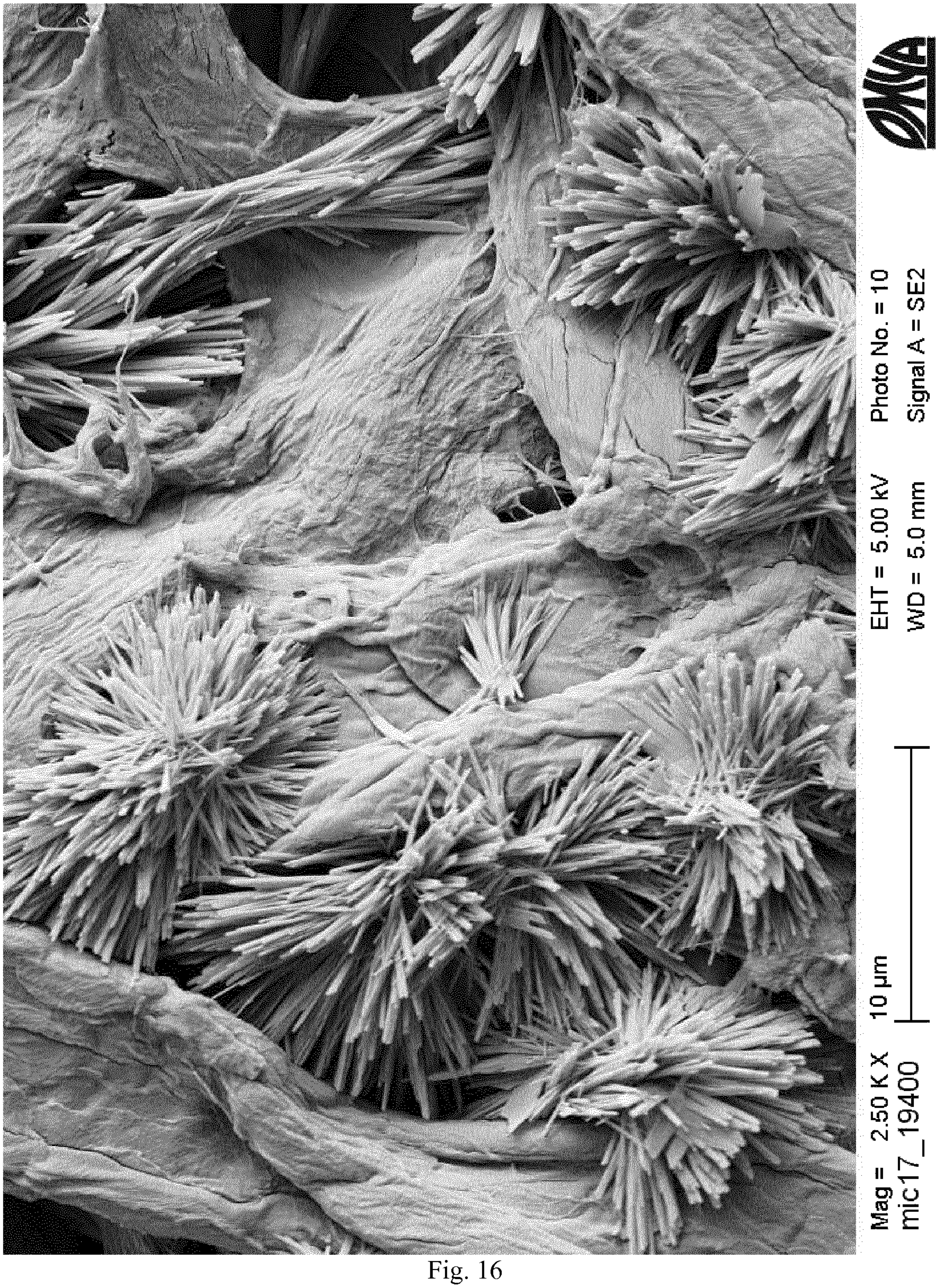
FIG. 16 shows a SEM image with high order of magnitude of substrate 1 treated first with treatment composition C followed by treatment composition D. Calcium sulphate salt pigments of the water-insoluble pattern are visible on the fibres of the substrate.

Substrate 1 was treated first with treatment composition C, followed by treatment composition D about 15 minutes later. Calcium sulphate salt (gypsum) pigments of the water-insoluble pattern were detected by SEM imaging on and between the fibres of the substrate (see FIGS. 15 and 16).

The invention claimed is:

1. A method of manufacturing a water-insoluble pattern on and/or within a substrate, the method comprising the following steps:

a) providing a substrate, b) providing a treatment composition A comprising a deliquescent salt, c) providing a treatment composition B comprising an acid or a salt thereof, wherein the deliquescent salt of the treatment composition A and the acid or the salt thereof of the treatment composition B are selected such that the cation of the deliquescent salt and the anion of the acid or the salt thereof are capable of forming a water-insoluble salt in aqueous medium, and d) depositing the treatment composition A and the treatment composition B onto at least one surface region of the substrate to form at least one water-insoluble pattern on and/or within the substrate, wherein the treatment composition A and the treatment composition B are at least partially contacted and are deposited simultaneously or consecutively in any order, wherein the acid or the salt thereof in the treatment composition B is selected from the group consisting of hydrochloric acid, sulphuric acid, sulphurous acid, phosphoric acid, oxalic acid, tartaric acid, salts thereof, bicarbonates, carbonates, and mixtures thereof.

2. The method according to claim 1, wherein treatment composition A or treatment composition B is provided in liquid form.

3. The method according to claim 1, wherein the substrate is a planar substrate having a first side and a reverse side, and the treatment composition A and the treatment composition B are deposited onto the first side of the substrate, or the treatment composition A and the treatment composition B are deposited onto the reverse side of the substrate.

4. The method according to claim 1, wherein the substrate is a planar substrate having a first side and a reverse side, and the treatment composition A is deposited onto the first side of the substrate and the treatment composition B is deposited onto the reverse side of the substrate, or the treatment composition B is deposited onto the first side of the substrate and the treatment composition A is deposited onto the reverse side of the substrate.

5. The method according to claim 1, wherein step d) comprises the steps of:

i) depositing the treatment composition A, and ii) subsequently depositing the treatment composition B, wherein the treatment composition A is contacted at least partially with the treatment composition B.

6. The method according to claim 1, wherein step d) comprises the steps of:

i) depositing the treatment composition B, and ii) subsequently depositing the treatment composition A, wherein the treatment composition B is contacted at least partially with the treatment composition A.

7. The method according to claim 1, wherein the substrate is dried after step i) and/or step ii).

8. The method according to claim 1, wherein the deliquescent salt of composition A is selected from the group consisting of chlorates, sulphates, halides, nitrates, carboxylates, and mixtures and hydrates thereof.

9. The method according to claim 1, wherein the treatment composition A comprises the deliquescent salt in an amount from 0.1 wt. % to 100 wt. %, based on the total weight of the treatment composition.

10. The method according to claim 1, wherein the treatment composition B comprises the acid or the salt thereof in an amount from 0.1 wt. % to 100 wt. %, based on the total weight of the treatment composition.

11. The method according to claim 1, wherein the substrate is selected from the group consisting of paper, cardboard, containerboard, plastic, cellophane, textile, wood, metal, glass, mica plate, cellulose, nitrocellulose, cotton, marble, calcite, natural stone, composite stone, brick, concrete, tablet, canvas, natural materials of human or animal origin, and laminates or composites thereof.

12. The method according to claim 1, wherein the treatment composition A and/or the treatment composition B is/are deposited by electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating and/or a pencil.

13. The method according to claim 1, wherein the water-insoluble pattern is a channel, a barrier, an array, a one-dimensional bar code, a two-dimensional bar code, a three-dimensional bar code, a security mark, a number, a letter, an alphanumerical symbol, a text, a logo, an image, a shape, a braille marking, or a design.

14. A substrate comprising a water-insoluble pattern obtained by a method according to claim 1.

15. The substrate according to claim 14, wherein the water-insoluble pattern is a hidden pattern, which is invisible when viewed at a first angle relative to the surface of the substrate, and visible when viewed from a second angle relative to the surface of the substrate.

16. The substrate according to claim 14, wherein the water-insoluble pattern is a tactile pattern.

17. A product comprising a substrate according to claim 14, wherein the product is a tool for bioassays, a microfluidic device, a lab-on-a-chip device, a paper-based analytical and/or diagnostic tool, a separation platform, a print medium, a packaging material, a data storage, a security document, a non-secure document, a decorative substrate, a drug, a tobacco product, a bottle, a garment, a container, a sporting good, a toy, a game, a mobile phone, a CD, a DVD, a blue ray disk, a machine, a tool, a car part, a sticker, a label, a tag, a poster, a passport, a driving licence, a bank card, a credit card, a bond, a ticket, a postage stamp, a tax stamp, a banknote, a certificate, a brand authentication tag, a business card, a greeting card, a braille document, a tactile document, or a wall paper.

18. A tactile application, a braille application, a printing application, an analytical application, a diagnostic application, a bioassay, a chemical application, an electrical application, a security device, an overt or covert security element, a brand protection, a micro lettering application, a micro imaging application, a decorative application, an artistic application, a visual application, or a packaging application, comprising a substrate comprising a water-insoluble pattern according to claim 14.

19. The method according to claim 2, wherein the treatment composition A and the treatment composition B are provided in liquid form.

20. The method according to claim 8, wherein the deliquescent salt of composition A is selected from the group consisting of chlorates, sulphates, halides, nitrates, carboxylates, and mixtures and hydrates thereof.

21. The method according to claim 8, wherein the deliquescent salt of composition A is selected from the group consisting of zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate and mixtures and hydrates thereof.

22. The method according to claim 9, wherein the amount of the deliquescent salt is selected from the group consisting of 1 wt. % to 80 wt. %, 3 wt. % to 60 wt. % and 10 wt. % to 50 wt. %.

23. The method according to claim 1, wherein the acid or the salt thereof in the treatment composition B is selected from the group consisting of phosphoric acid, oxalic acid, tartaric acid and mixtures thereof.

24. The method according to claim 10, wherein the acid or the salt thereof in the treatment composition B is present in an amount selected from the group consisting of 1 wt.-% to 80 wt.-%, 3 wt.-% to 60 wt.-% and 10 wt.-% to 50 wt.-%.

25. The method according to claim 11, wherein the substrate is selected from the group consisting of paper, cardboard, containerboard and plastic.

26. The method according to claim 12, wherein the treatment composition A and/or the treatment composition B is/are deposited by inkjet printing or spray coating.

27. The substrate according to claim 16, wherein the water-insoluble pattern is a braille marking.

* * * * *